United States Patent
Kubota et al.

(10) Patent No.: US 10,802,254 B2
(45) Date of Patent: *Oct. 13, 2020

(54) IMAGING LENS

(71) Applicant: KANTATSU CO., LTD., Tochigi (JP)

(72) Inventors: Yoji Kubota, Nagano (JP); Kenichi Kubota, Tochigi (JP); Hitoshi Hirano, Tochigi (JP); Hisao Fukaya, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,523

(22) Filed: Jun. 26, 2019

(65) Prior Publication Data
US 2019/0317301 A1 Oct. 17, 2019

Related U.S. Application Data

(63) Continuation of application No. 15/883,160, filed on Jan. 30, 2018, now Pat. No. 10,488,626, which is a continuation of application No. 15/237,760, filed on Aug. 16, 2016, now Pat. No. 10,012,820, which is a continuation of application No. 14/609,469, filed on Jan. 30, 2015, now Pat. No. 9,448,387.

(30) Foreign Application Priority Data

Jul. 2, 2014 (JP) ................................ 2014-136552

(51) Int. Cl.
G02B 3/02 (2006.01)
G02B 15/14 (2006.01)
G02B 13/00 (2006.01)
G02B 5/00 (2006.01)
G02B 9/62 (2006.01)
G02B 27/00 (2006.01)

(52) U.S. Cl.
CPC ......... *G02B 13/0045* (2013.01); *G02B 5/005* (2013.01); *G02B 9/62* (2013.01); *G02B 27/0025* (2013.01)

(58) Field of Classification Search
CPC .......... G02B 13/00; G02B 9/62; G02B 13/16; G02B 13/0045; G02B 13/24
USPC ................................ 359/759, 619, 713, 691
See application file for complete search history.

(56) References Cited

U.S. PATENT DOCUMENTS

| 1,012,820 | A1 | 7/2018 | Kubota | |
| 10,488,626 | B2* | 11/2019 | Kubota | G02B 27/0025 |
| 2012/0268835 | A1 | 10/2012 | Huang | |

(Continued)

FOREIGN PATENT DOCUMENTS

JP 2013-195587 A 9/2013

*Primary Examiner* — Mohammed A Hasan
(74) *Attorney, Agent, or Firm* — Kubotera & Associates, LLC

(57) ABSTRACT

An imaging lens includes a first lens group and a second lens group, arranged in this order from an object side to an image plane side. The first lens group includes a first lens, a second lens, and a third lens having negative refractive power. The second lens group includes a fourth lens having positive refractive power, a fifth lens, and a sixth lens. The third lens has a concave surface facing the image plane side near an optical axis thereof. The fifth lens has a concave surface facing the image plane side near an optical axis thereof. The fourth lens has a specific Abbe's number.

20 Claims, 21 Drawing Sheets

(56) References Cited

U.S. PATENT DOCUMENTS

| | | |
|---|---|---|
| 2013/0148213 A1* | 6/2013 | Peng .................. G02B 13/18 |
| | | 359/717 |
| 2014/0063323 A1 | 3/2014 | Yamazaki et al. |
| 2015/0092280 A1 | 4/2015 | Ikeda et al. |
| 2015/0198787 A1 | 7/2015 | Kubota et al. |
| 2016/0004042 A1 | 1/2016 | Kubota et al. |
| 2016/0131899 A1 | 5/2016 | Jo |
| 2016/0139368 A1 | 5/2016 | You |
| 2016/0154211 A1 | 6/2016 | Jo |
| 2016/0282588 A1* | 9/2016 | Sekine .................. G02B 9/62 |
| 2019/0317300 A1* | 10/2019 | Kubota .............. G02B 13/0045 |

* cited by examiner

IMAGING LENS

CROSS-REFERENCE TO RELATED APPLICATIONS

This is a continuation application of a prior application Ser. No. 15/883,160, filed on Jan. 30, 2018, pending, which is a continuation application of a prior application Ser. No. 15/237,760, filed on Aug. 16, 2016, issued on Jul. 3, 2018 as U.S. Pat. No. 10,012,820, which is a continuation application of a prior application Ser. No. 14/609,469, issued on Sep. 20, 2016 as U.S. Pat. No. 9,448,387.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to achieve functions such as those of digital still cameras and car navigation systems on the smartphones. In order to achieve those various functions, most models of smartphones include cameras similar to cellular phones.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years.

As a method of attaining the high-resolution imaging lens, there has been a method of increasing the number of lenses that compose the imaging lens. However, the increase of the number of lenses easily causes an increase in the size of the imaging lens. Therefore, the lens configuration having a large number of lenses has a disadvantage in terms of mounting in a small-sized camera such as the above-described smartphones. For this reason, an imaging lens has been developed so as to restrain the number of lenses as small as possible. However, with rapid advancement in achieving the higher pixel count of an imaging element in these days, an imaging lens has been developed so as to attain higher resolution rather than a shorter total track length of the imaging lens. For example, conventionally, it has been typical to mount a camera unit, which includes an imaging lens and an imaging element, in the smartphone. There has also been an attempt to attach a separate camera unit onto a smartphone, whereby it is possible to obtain images equivalent to those of digital still cameras.

In case of a lens configuration composed of six lenses, due to the large number of lenses of the imaging lens, it is somewhat difficult to reduce the size of the imaging lens. However, because of high flexibility in design, it has potential to attain satisfactory correction of aberrations and downsizing in a balanced manner. For example, as the imaging lens having the six-lens configuration as described above, an imaging lens described in Patent Reference has been known.

Patent Reference: Japanese Patent Application Publication No. 2013-195587

The imaging lens described in Patent Reference includes a first lens that is positive and directs a convex surface thereof to an object side, a second lens that is negative and directs a concave surface thereof to an image plane side, a third lens that is negative and directs a concave surface thereof to the object side, a fourth and fifth lenses that are positive and direct convex surfaces thereof to the image plane side, and a sixth lens that is negative and directs a concave surface thereof to the object side. According to the conventional imaging lens of Patent Reference, by satisfying conditional expressions of a ratio between a focal length of the first lens and a focal length of the third lens and a ratio between a focal length of the second lens and a focal length of the whole lens system, it is achievable to satisfactorily correct a distortion and a chromatic aberration.

Each year, functions and sizes of cellular phones and smartphones are getting higher and smaller, and the level of a small size required for an imaging lens is even higher than before. In case of the imaging lens of Patent Reference, since a distance from an object-side surface of a first lens to an image plane of an imaging element is long, there is a limit by itself to achieve satisfactory correction of aberrations while downsizing the imaging lens to satisfy the above-described demands.

Here, such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

In order to attain the objects described above, according to a first aspect of the present invention, an imaging lens includes a first lens group having positive refractive power; and a second lens group having negative refractive power, arranged in the order from an object side to an image plane side. The first lens group includes a first lens having positive refractive power, a second lens having positive refractive power, and a third lens having negative refractive power. The second lens group includes a fourth lens having positive refractive power, a fifth lens, and a sixth lens having negative refractive power.

According to the first aspect of the present invention, when the first lens has a focal length $f1$, the second lens has a focal length $f2$, the first lens has an Abbe's number $vd1$, the second lens has an Abbe's number $vd2$, and the third lens has an Abbe's number $vd3$, the imaging lens of the present invention satisfies the following conditional expressions (1) to (4):

$$0.3 < f1/f2 < 0.9 \qquad (1)$$

$$40 < vd1 < 75 \qquad (2)$$

$$40 < vd2 < 75 \qquad (3)$$

$$15 < vd3 < 35 \qquad (4)$$

According to the first aspect of the present invention, the first lens group is composed of three lenses, whose refractive powers are arranged in the order of positive-positive-negative. Those three lenses are respectively made of lens materials that satisfy the conditional expressions (2) through (4), and the first and the second lenses and the third lens are a combination of low dispersion materials and a high dispersion material. With such arrangement of refractive powers and the order of Abbe's numbers of those lenses, in the first lens group, it is achievable to suitably restrain generation of chromatic aberration and satisfactorily correct the chromatic aberration, if generated.

According to the first aspect of the present invention, positive refractive power is shared between the two lenses, the first lens and the second lens. Therefore, it is achievable to restrain the refractive powers of the first lens and the second lens to be relatively weak, and it is achievable to suitably downsize the imaging lens while satisfactorily correcting aberrations.

As shown in the conditional expression (1), the first lens and the second lens having positive refractive powers in the first lens group are formed such that the first lens has stronger refractive power than that of the second lens. Therefore, the first lens, which is the lens closest to the object in the first lens group, has strong positive refractive power, so that it is achievable to more suitably downsize the imaging lens.

When the imaging lens satisfies the conditional expression (1), it is also achievable to restrain an astigmatism, a chromatic aberration, and a field curvature respectively within preferred ranges in a balanced manner, while downsizing the imaging lens. When the value exceeds the upper limit of "0.9", the first lens has weak refractive power relative to that of the second lens. Therefore, although it is advantageous to secure a back focal length, it is difficult to downsize the imaging lens.

In addition, since an astigmatic difference increases, it is difficult to correct the astigmatism, and it is difficult to obtain satisfactory image-forming performance. On the other hand, when the value is below the lower limit of "0.3", the first lens has strong refractive power relative to that of the second lens, so that it is advantageous for downsizing of the imaging lens. However, the back focal length is short, and it is difficult to secure space to dispose an insert such as an infrared cutoff filter.

Moreover, in the astigmatism, a sagittal image surface curves to the object side, and a chromatic aberration of magnification for an off-axis light flux is excessively corrected (an image-forming point at a short wavelength moves in a direction to be away from an optical axis relative to an image-forming point at a reference wavelength) at the periphery of the image. Therefore, it is difficult to obtain satisfactory image-forming performance.

According to a second aspect of the present invention, when the whole lens system has a focal length f, the first lens group has a focal length F1, the imaging lens having the above-described configuration preferably satisfies the following conditional expression (5):

$$0.8 < F1/f < 1.2 \quad (5)$$

When the imaging lens satisfies the conditional expression (5), it is achievable to restrain the chromatic aberration and the astigmatism within preferable ranges, while downsizing the imaging lens. In addition, when the imaging lens satisfies the conditional expression (5), it is also achievable to restrain an incident angle of a light beam emitted from the imaging lens to the image plane within the range of chief ray angle (CRA). As is well known, a so-called chief ray angle (CRA) is set in advance for an imaging element such as a CCD sensor or a CMOS sensor, i.e., a range of an incident angle of a light beam that can be taken in the sensor. By restraining the incident angle of a light beam emitted from the imaging lens to the image plane within the range of CRA, it is possible to suitably restrain generation of shading, which is a phenomenon of becoming dark on the image periphery.

When the value exceeds the upper limit of "1.2" in the conditional expression (5), the first lens group has weak refractive power relative to that of the whole lens system. Therefore, although it is advantageous for correction of an axial chromatic aberration, it is difficult to downsize the imaging lens. Moreover, the astigmatic difference increases at the periphery of the image, so that it is difficult to obtain satisfactory image-forming performance.

On the other hand, when the value is below the lower limit of "0.8", the first lens group has strong refractive power relative to that of the whole lens system, so that it is advantageous for downsizing of the imaging lens. However, the axial chromatic aberration is insufficiently corrected (a focal position at a short wavelength moves to the object side relative to a focal position at a reference wavelength), and a chromatic aberration of magnification is excessively corrected. Moreover, an image-forming surface curves to the object side at image periphery, i.e., the field curvature is insufficiently corrected, so that it is difficult to obtain satisfactory image-forming performance. Furthermore, it is also difficult to restrain the incident angle of a light beam emitted from the imaging lens to the image plane within the range of CRA.

According to a third aspect of the present invention, when the whole lens system has a focal length f, the imaging lens having the above-described configuration preferably satisfies the following conditional expression (6):

$$1.0 < f2/f < 2.0 \quad (6)$$

When the imaging lens satisfies the conditional expression (6), it is possible to restrain the chromatic aberration and the astigmatism within preferred ranges, while downsizing the imaging lens. When the value exceeds the upper limit of "2.0", the second lens has weak refractive power relative to that of the whole lens system. Therefore, the first lens has relatively strong refractive power in the first lens group, and it is advantageous for downsizing of the imaging lens. However, the axial chromatic aberration is insufficiently corrected, and the chromatic aberration of magnification for an off-axis light flux at the periphery of the image is excessively corrected, so that it is difficult to obtain satisfactory image-forming performance.

On the other hand, when the value is below the lower limit of "1.0", the second lens has strong refractive power relative to that of the whole lens system. Therefore, although it is advantageous for securing the back focal length, the astigmatic difference increases at the image periphery, and it is difficult to obtain satisfactory image-forming performance.

According to a fourth aspect of the present invention, when the third lens has a focal length f3, the imaging lens having the above-described configuration preferably satisfies the following conditional expression (7):

$$-1.2 < f1/f3 < -0.4 \quad (7)$$

When the imaging lens satisfies the conditional expression (7), it is achievable to satisfactorily correct the chromatic aberration, the field curvature, and the astigmatism.

When the value exceeds the upper limit of "−0.4", the first lens has strong positive refractive power relative to the negative refractive power of the third lens. As a result, the axial chromatic aberration is insufficiently corrected and the chromatic aberration of magnification is excessively corrected. Moreover, the field curvature is insufficiently corrected at the periphery of the image, and it is difficult to obtain satisfactory image-forming performance.

On the other hand, when the value is below the lower limit of "−1.2", the first lens has weak positive refractive power relative to the negative refractive power of the third lens. Therefore, in the astigmatism, a tangential image surface curves to the image plane side and the astigmatic difference increases, so that also in this case, it is difficult to obtain satisfactory image-forming performance.

According to a fifth aspect of the present invention, when the first lens group has a focal length F1, the second lens group has a focal length F2, the imaging lens having the above-described configuration preferably satisfies the following conditional expression (8):

$$-12 < F2/F1 < -1.5 \tag{8}$$

When the imaging lens satisfies the conditional expression (8), it is achievable to restrain the astigmatism, the field curvature, and the chromatic aberration within preferred ranges in a balanced manner, while downsizing the imaging lens. When the value exceeds the upper limit of "−1.5", it is advantageous for downsizing of the imaging lens. However, the axial chromatic aberration is insufficiently corrected, and the chromatic aberration of magnification for an off-axis light flux at the periphery of the image is excessively corrected. Moreover, the astigmatic difference increases, and the field curvature is insufficiently corrected, so that it is difficult to obtain satisfactory image-forming performance.

On the other hand, when the value is below the lower limit of "−12", although it is easy to secure the back focal length, it is difficult to downsize the imaging lens. In addition, the astigmatic difference increases and the image-forming surface curves to the image plane side, i.e., the field curvature is excessively corrected. As a result, it is difficult to obtain satisfactory image-forming performance.

According to a sixth aspect of the present invention, when the whole lens system has a focal length f, a distance on an optical axis between the third lens and the fourth lens is D34, the imaging lens having the above-described configuration preferably satisfies the following conditional expression (9):

$$0.05 < D34/f < 0.35 \tag{9}$$

When the imaging lens satisfies the conditional expression (9), it is achievable to restrain the distortion, the astigmatism, and the field curvature within preferred ranges in a balanced manner, while restraining the incident angle of a light beam emitted from the imaging lens to the image plane within the range of CRA. When the value exceeds the upper limit of "0.35", although it is easy to restrain the incident angle within the range of CRA, it is difficult to secure the back focal length. Moreover, the plus distortion increases, and the field curvature is excessively corrected, so that it is difficult to obtain satisfactory image-forming performance.

On the other hand, when the value is below the lower limit of "0.05", the axial chromatic aberration is insufficiently corrected. In addition, the field curvature is insufficiently corrected and the astigmatic difference increases, so that it is difficult to obtain satisfactory image-forming performance.

Furthermore, it is difficult to restrain the incident angle of a light beam emitted from the imaging lens to the image plane within the range of CRA.

According to a seventh aspect of the present invention, when the fourth lens has an Abbe's number vd4, the fifth lens has an Abbe's number vd5, and the sixth lens has an Abbe's number vd6, in order to more satisfactorily correct the chromatic aberration, the imaging lens having the above-described configuration preferably satisfies the following conditional expressions (10) through (12):

$$15 < vd4 < 35 \tag{10}$$

$$40 < vd5 < 75 \tag{11}$$

$$40 < vd6 < 75 \tag{12}$$

According to an eighth aspect of the present invention, when the fifth lens has negative refractive power, the fourth lens has a focal length f4, and the fifth lens has a focal length f5, the imaging lens having the above-described configuration preferably satisfies the following conditional expression (13):

$$-15 < f5/f4 < -5 \tag{13}$$

When the imaging lens satisfies the conditional expression (13), it is achievable to satisfactorily correct the chromatic aberration of magnification and the field curvature. When the value exceeds the upper limit of "−5", the fifth lens has strong negative refractive power relative to the positive refractive power of the fourth lens. As a result, the chromatic aberration of magnification for an off-axis light flux at the periphery of the image is excessively corrected and the field curvature is insufficiently corrected. Therefore, it is difficult to obtain satisfactory image-forming performance.

On the other hand, when the value is below the lower limit of "−15", the fifth lens has weak negative refractive power relative to the positive refractive power of the fourth lens. In order to satisfactorily correct the aberrations, it is necessary to increase the refractive power of the sixth lens, which has negative refractive power similar to the fifth lens in the second lens group. In this case, however, although it is advantageous for correction of the field curvature, the chromatic aberration of magnification is excessively corrected at the periphery of the image, so that it is difficult to obtain satisfactory image-forming performance.

According to a ninth aspect of the present invention, when the whole lens system has a focal length f, a composite focal length of the fifth lens and the sixth lens is f56, the imaging lens having the above-described configuration preferably satisfies the following conditional expression (14):

$$-3 < f56/f < -0.8 \tag{14}$$

When the imaging lens satisfies the conditional expression (14), it is achievable to restrain the chromatic aberration, the distortion, and the astigmatism within preferred ranges in a balanced manner, while downsizing the imaging lens. When the value exceeds the upper limit of "−0.8", the second lens group has relatively strong negative refractive power, which is advantageous for downsizing of the imaging lens. However, the plus distortion increases and the chromatic aberration of magnification is excessively corrected at the periphery of the image, so that it is difficult to obtain satisfactory image-forming performance.

On the other hand, when the value is below the lower limit of "−3", although it is easy to secure the back focal length, it is difficult to downsize the imaging lens. Moreover, the minus distortion increases and the astigmatic difference increases, so that it is difficult to obtain satisfactory image-forming performance.

According to a tenth aspect of the present invention, when the sixth lens has a focal length f6 and a composite focal length of the fifth lens and the sixth lens is f56, the imaging lens having the above-described configuration preferably satisfies the following conditional expression (15):

$$0.7 < f6/f56 < 1.2 \quad (15)$$

When the imaging lens satisfies the conditional expression (15), it is achievable to restrain the chromatic aberration, the field curvature, and the distortion within preferred ranges in a balanced manner. As shown in the conditional expression (15), according to the imaging lens of the present invention, the negative refractive power of the second lens group is mostly made up by the sixth lens. The fifth lens has very weak refractive power relative to that of the sixth lens. With such configuration, the fifth lens can contribute to fine correction of the aberrations, and the sixth lens can contribute to suitably restraining of the incident angle to the image plane within the range of CRA as well as correction of the aberrations.

When the value exceeds the upper limit of "1.2", although it is advantageous for correction of the axial chromatic aberration, the minus distortion increases. Moreover, the field curvature is insufficiently corrected and the chromatic aberration of magnification is excessively corrected, so that it is difficult to obtain satisfactory image-forming performance. On the other hand, when the value is below the lower limit of "0.7", although it is easy to correct the distortion, the axial chromatic aberration is insufficiently corrected, and it is difficult to obtain satisfactory image-forming performance.

According to an eleventh aspect of the present invention, when the whole lens system has a focal length f, the sixth lens has a focal length f6, the imaging lens having the above-described configuration preferably satisfies the following conditional expression (16):

$$-3.5 < f6/f < -0.5 \quad (16)$$

When the imaging lens satisfies the conditional expression (16), it is achievable to restrain the chromatic aberration, the distortion, and the astigmatism within preferred ranges in a balanced manner, while downsizing the imaging lens. In addition, when the imaging lens satisfies the conditional expression (16), it is also achievable to restrain the incident angle of a light beam emitted from the imaging lens to the image plane within the range of CRA. When the value exceeds the upper limit of "0.5", it is advantageous for correction of the axial chromatic aberration. However, the plus distortion increases and the chromatic aberration of magnification for an off-axis light flux at the periphery of the image is excessively corrected, so that it is difficult to obtain satisfactory image-forming performance. In addition, it is difficult to restrain the incident angle of a light beam emitted from the imaging lens to the image plane within the range of CRA.

On the other hand, when the value is below the lower limit of "−3.5", although it is easy to restrain the incident angle to the image plane within the range of CRA, the minus distortion increases and the chromatic aberration of magnification for an off-axis light flux at the periphery of the image is insufficiently corrected, so that it is difficult to obtain satisfactory image-forming performance.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, 16, and 19 are schematic sectional views of the imaging lenses in Numerical Data Examples 1 to 7 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
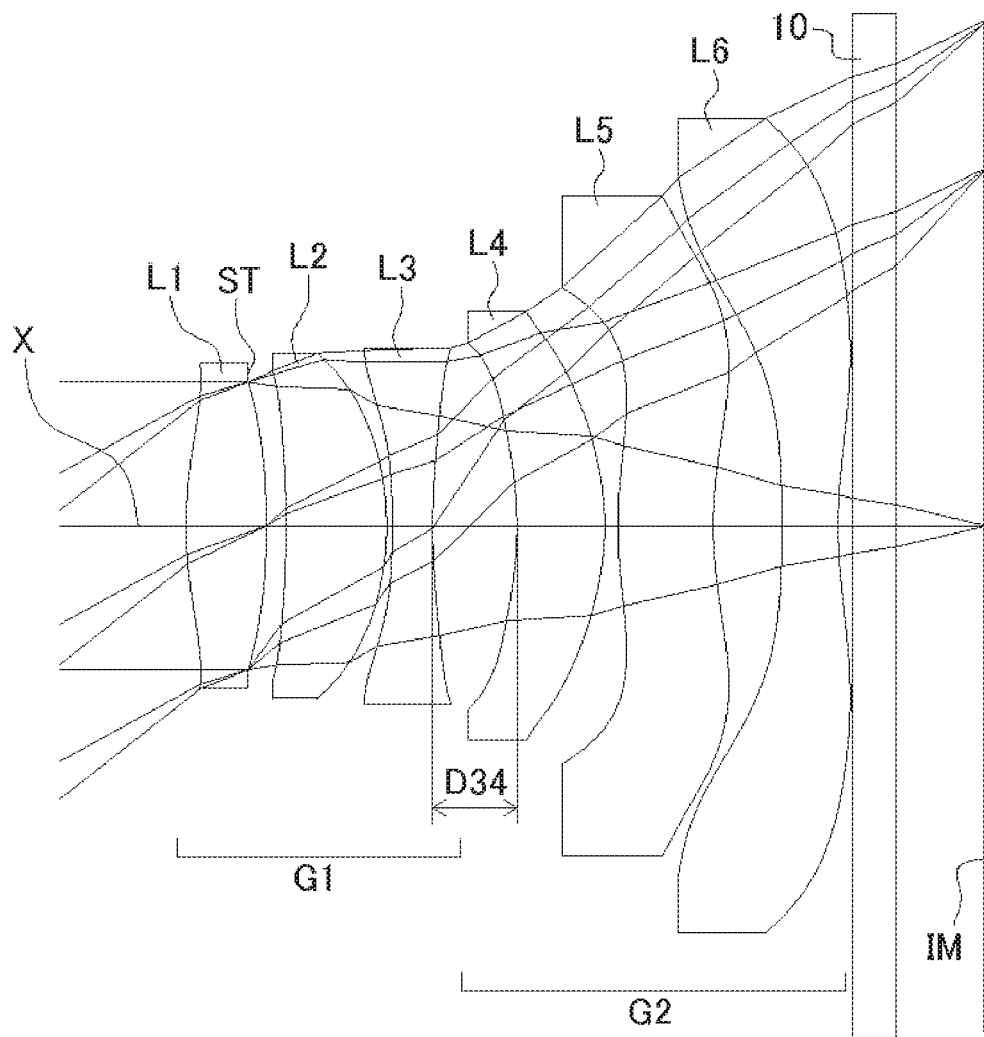
FIG. 1 shows a sectional view of a schematic configuration of an imaging lens in Numerical Data Example 1 according to an embodiment of the present invention.

As shown in FIG. 1, according to the embodiment, the imaging lens includes a first lens group G1 having positive refractive power, and a second lens group G2 having negative refractive power, arranged in the order from an object side to an image plane side. Between the second lens group G2 and an image plane IM of an imaging element, there is provided a filter 10. The filter 10 is omissible.

The first lens group G1 includes a first lens L1 having positive refractive power, an aperture stop ST, a second lens L2 having positive refractive power, and a third lens L3 having negative refractive power, arranged in the order from the object side. According to the imaging lens of the embodiment, the aperture stop ST is provided on an image plane-side surface of the first lens L1. Here, the position of the aperture stop ST is not limited to be between the first lens L1 and the second lens L2 as in the imaging lens of Numerical Data Example 1.

For example, it is also possible to dispose the aperture stop ST on the object side of the first lens L1. In case of a so-called "front aperture"-type lens configuration, in which the aperture stop ST is disposed on the object side of the imaging lens, it is achievable to improve the ease of lens assembly and reduce the manufacturing cost. In case of the front aperture-type lens configuration, since it is also relatively easy to shorten a total track length of the imaging lens, the lens configuration is also effective for mounting in a portable device such as cellular phones and smartphones that are popular in these years.

On the other hand, in case of a so-called "mid aperture"—type lens configuration, in which the aperture stop ST is disposed between the first lens L1 and the second lens L2 as in Numerical Data Example 1, an effective diameter of the first lens L1 is large relative to the total track length of the imaging lens. Therefore, the presence of the imaging lens in a camera is emphasized, and it is possible to appeal to users by the luxurious impression, high lens performance, etc. as a part of design of the camera.

In the first lens group G1, the first lens L1 is formed in a shape such that a curvature radius r1 of an object-side surface thereof is positive and a curvature radius r2 of an image plane-side surface thereof is negative, so as to have a shape of a biconvex lens near an optical axis X. The shape of the first lens L1 is not limited to the one in Numerical Data Example 1. The first lens L1 can be formed in any shape, as long as the curvature radius r1 of the object-side surface thereof is positive. More specifically, the first lens L1 can also be formed in a shape such that the curvature radius r2 is positive so as to have a shape of a meniscus lens directing a convex surface thereof to the object side near the optical axis X.

The second lens L2 is formed in a shape such that a curvature radius r3 of an object-side surface and a curvature radius r4 of an image plane-side surface thereof are both negative, so as to have a shape of a meniscus lens directing a concave surface thereof to the object side near the optical axis X. The shape of the second lens L2 is not limited to the one in Numerical Data Example 1. The second lens L2 can be formed in any shape, as long as the curvature radius r4 of the image plane-side surface thereof is negative. More specifically, the second lens L2 can be formed in a shape such that the curvature radius r3 of the object-side surface thereof is positive so as to have a shape of a biconvex lens near the optical axis X. Here, generally speaking, when the first lens L1 has a shape of a meniscus lens directing a convex surface thereof to the object side near the optical axis X, the shape of the second lens L2 is preferably biconvex near the optical axis X as described above.

The third lens L3 is formed in a shape such that a curvature radius r5 of an object-side surface thereof is negative and a curvature radius r6 of an image plane-side surface thereof is positive, so as to have a shape of a biconcave lens near the optical axis X. The shape of the third lens L3 is not limited to the one in Numerical Data Example 1, and can be any as long as the curvature radius r6 of the image plane-side surface thereof is positive. More specifically, the third lens L3 can also be formed in a shape such that the curvature radius r5 of the object-side surface thereof is positive, i.e. a shape of a meniscus lens directing a convex surface thereof to the object side near the optical axis X.

The second lens group G2 includes the fourth lens L4 having positive refractive power, the fifth lens L5 having negative or positive refractive power, and the sixth lens L6 having negative refractive power, arranged in the order from the object side.

In the second lens group G2, the fourth lens L4 is formed in a shape such that a curvature radius r7 of an object-side surface thereof and a curvature radius r8 of an image plane-side surface thereof are both negative, so as to have a shape of a meniscus lens directing a concave surface thereof to the object side near the optical axis X. The fifth lens L5 is formed in a shape such that a curvature radius r9 of an object-side surface thereof and a curvature radius r10 of an image plane-side surface thereof are both positive, so as to have a shape of a meniscus lens directing a convex surface thereof to the object side near the optical axis X. The fifth lens L5 has the weakest refractive power in the second lens group G2. The imaging lenses of Numerical Data Examples 1 to 6 are examples of a lens configuration, in which the fifth lens L5 has negative refractive power. The imaging lens of Numerical Data Example 7 is an example, in which the fifth lens L5 has positive refractive power.

The sixth lens L6 is formed in a shape such that a curvature radius r11 of an object-side surface thereof is negative and a curvature radius r12 of an image plane-side surface thereof is positive, so as to have a shape of a biconcave lens near the optical axis X. The shape of the sixth lens L6 is not limited to the one in Numerical Data Example 1, and can be any as long as the curvature radius r12 of the image plane-side surface thereof is positive. More specifically, the sixth lens L6 can also be formed in a shape such that the curvature radius r11 is positive, so as to have a shape of a meniscus lens directing a convex surface thereof to the object side near the optical axis X. Numerical Data Examples 5 and 6 are examples, in which the shape of the sixth lens L6 is a meniscus lens directing a convex surface thereof to the object side near the optical axis X.

The fifth lens L5 and the sixth lens L6 are formed such that the object-side surfaces thereof and the image plane-side surfaces thereof are formed as aspheric surfaces and formed in shapes such that positive refractive power becomes stronger toward the lens peripheries. With those shapes of the fifth lens L5 and the sixth lens L6, it is achievable to satisfactorily correct not only the axial chromatic aberration but also the off-axis chromatic aberration of magnification, and to suitably restrain the incident angle of a light beam emitted from the imaging lens to the image plane IM within the range of a chief ray angle (CRA).

According to the embodiment, the imaging lens satisfies the following conditional expressions (1) to (16):

$$0.3 < f1/f2 < 0.9 \quad (1)$$

$$40 < vd1 < 75 \quad (2)$$

$$40 < vd2 < 75 \quad (3)$$

$$15 < vd3 < 35 \quad (4)$$

$$0.8 < F1/f < 1.2 \quad (5)$$

$$1.0 < f2/f < 2.0 \quad (6)$$

$$-1.2 < f1/f3 < -0.4 \quad (7)$$

$$-12 < F2/F1 < -1.5 \quad (8)$$

$$0.05 < D34/f < 0.35 \quad (9)$$

$$15 < vd4 < 35 \quad (10)$$

$$40 < vd5 < 75 \quad (11)$$

$$40 < vd6 < 75 \quad (12)$$

$$-15 < f5/f4 < -5 \quad (13)$$

$$-3 < f56/f < -0.8 \quad (14)$$

$$0.7 < f6/f56 < 1.2 \quad (15)$$

$$-3.5 < f6/f < -0.5 \quad (16)$$

In the above Conditional Expressions:
f: Focal length of a whole lens system
F1: Focal length of the first lens group G1
F2: Focal length of the second lens group G2
f1: Focal length of the first lens L1
F2: Focal length of the second lens L2
f3: Focal length of the third lens L3
f4: Focal length of the fourth lens L4
f5: Focal length of the fifth lens L5
f6: Focal length of the sixth lens L6
f56: Composite focal length of the fifth lens L5 and the sixth lens L6
D34: Distance on the optical axis X between the third lens 3 and the fourth lens L4
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5
vd6: Abbe's number of the sixth lens L6

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. When the aspheric shapes applied to the lens surfaces have an axis Z in a direction of the optical axis X, a height H in a direction perpendicular to the optical axis X, a conic constant k, and aspheric coefficients $A_4$, $A_6$, $A_8$, $A_{10}$, $A_{12}$, $A_{14}$, and $A_{16}$, the aspheric shapes of the lens surfaces are expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

NUMERICAL DATA EXAMPLE 1

Basic data are shown below.
f = 4.33 mm, Fno = 2.2, ω = 38.2°
Unit: mm

Surface Data

| Surface Number i | r | d | nd | vd |
|---|---|---|---|---|
| (Object) | ∞ | ∞ | | |
| 1* | 2.952 | 0.545 | 1.5346 | 56.1(=vd1) |
| 2*(Stop) | −5.004 | 0.135 | | |
| 3* | −6.123 | 0.687 | 1.5346 | 56.1(=vd2) |
| 4* | −2.024 | 0.039 | | |
| 5* | −6.319 | 0.276 | 1.6355 | 24.0(=vd3) |
| 6* | 4.221 | 0.574(=D34) | | |
| 7* | −2.502 | 0.600 | 1.6142 | 26.0(=vd4) |
| 8* | −1.965 | 0.089 | | |
| 9* | 2.907 | 0.651 | 1.5346 | 56.1(=vd5) |
| 10* | 2.542 | 0.468 | | |
| 11* | −14.797 | 0.385 | 1.5346 | 56.1(=vd6) |
| 12* | 3.222 | 0.100 | | |
| 13 | ∞ | 0.300 | 1.5168 | 64.2 |
| 14 | ∞ | 0.594 | | |
| (Image plane) | ∞ | | | |

Aspheric Surface Data

First Surface k = 0.000, $A_4$ = −5.137E−02, $A_6$ = −2.984E−03, $A_8$ = −4.195E−02, $A_{10}$ = 2.210E−02, $A_{12}$ = 1.049E−02, $A_{14}$ = −2.184E−02, $A_{16}$ = 9.763E−03

Second Surface k = 0.000, $A_4$ = −2.310E−02, $A_6$ = 2.771E−03, $A_8$ = −2.867E−02, $A_{10}$ = 1.898E−02, $A_{12}$ = 2.730E−02, $A_{14}$ = −5.132E−02, $A_{16}$ = 2.649E−02

Third Surface k = 0.000, $A_4$ = 4.012E−02, $A_6$ = −2.211E−02, $A_8$ = 2.330E−02, $A_{10}$ = −5.307E−02, $A_{12}$ = 2.119E−02, $A_{14}$ = −5.489E−03, $A_{16}$ = 3.489E−03

Fourth Surface k = 0.000, $A_4$ = −1.972E−02, $A_6$ = −2.138E−02, $A_8$ = 2.704E−03, $A_{10}$ = 4.225E−04, $A_{12}$ = −1.088E−03, $A_{14}$ = 7.878E−04, $A_{16}$ = −8.316E−04

-continued

Basic data are shown below.
f = 4.33 mm, Fno = 2.2, ω = 38.2°
Unit: mm

Fifth Surface k = 0.000, $A_4$ = −1.503E−01, $A_6$ = 4.707E−02, $A_8$ = 2.472E−02,
$A_{10}$ = −1.528E−04, $A_{12}$ = 1.313E−02, $A_{14}$ = −1.462E−02,
$A_{16}$ = 3.514E−03
Sixth Surface k = 0.000, $A_4$ = −8.746E−02, $A_6$ = 4.078E−02, $A_8$ = 9.095E−04,
$A_{10}$ = 2.146E−03, $A_{12}$ = −6.727E−03, $A_{14}$ = 6.470E−03,
$A_{16}$ = −1.933E−03
Seventh Surface k = 0.000, $A_4$ = 1.303E−01, $A_6$ = −1.218E−01, $A_8$ = 8.443E−02,
$A_{10}$ = −5.973E−02, $A_{12}$ = 9.218E−03, $A_{14}$ = 5.782E−03,
$A_{16}$ = −1.730E−03
Eighth Surface k = 0.000, $A_4$ = 3.252E−02, $A_6$ = 1.663E−02, $A_8$ = −1.486E−02,
$A_{10}$ = 1.026E−03, $A_{12}$ = −1.109E−03, $A_{14}$ = 2.840E−04,
$A_{16}$ = 2.827E−04
Ninth Surface k = 0.000, $A_4$ = −1.577E−01, $A_6$ = 5.096E−02, $A_8$ = −1.989E−02,
$A_{10}$ = 2.009E−03, $A_{12}$ = −4.004E−04, $A_{14}$ = 1.630E−04,
$A_{16}$ = −4.771E−06
Tenth Surface k = 0.000, $A_4$ = −1.226E−01, $A_6$ = 2.829E−02, $A_8$ = −8.356E−03,
$A_{10}$ = 9.028E−04, $A_{12}$ = 2.097E−04, $A_{14}$ = −5.171E−05,
$A_{16}$ = 2.624E−06
Eleventh Surface k = 0.000, $A_4$ = −8.750E−02, $A_6$ = 1.549E−02, $A_8$ = 2.275E−04,
$A_{10}$ = 2.362E−05, $A_{12}$ = −5.834E−05, $A_{14}$ = 6.461E−06,
$A_{16}$ = −1.641E−07
Twelfth Surface k = 0.000, $A_4$ = −9.992E−02, $A_6$ = 2.511E−02, $A_8$ = −3.639E−03,
$A_{10}$ = 1.960E−04, $A_{12}$ = 8.694E−06, $A_{14}$ = −1.728E−06,
$A_{16}$ = 6.770E−08 f1 = 3.56 mm
f2 = 5.34 mm
f3 = −3.94 mm
f4 = 10.46 mm
f5 = −100.09 mm
f6 = −4.91 mm
f56 = −5.02 mm
F1 = 4.43 mm
F2 = −11.25 mm

The Values of the Respective Conditional Expressions are as Follows:

*f*1/*f*2=0.67

*F*1/*f*=1.02

*f*2/*f*=1.23

*f*1/*f*3=−0.90

*F*2/*F*1=−2.54

*D*34/*f*=0.13

*f*5/*f*4=−9.57

*f*56/*f*=−1.16

*f*6/*f*56=0.98

*f*6/*f*=−1.13

Accordingly, the imaging lens of Numerical Data Example 1 satisfies the above-described conditional expressions. The distance on the optical axis X from the object-side surface of the first lens L1 to the image plane IM (length without the filter 10) is 5.34 mm, and downsizing of the imaging lens is attained.

Figure 2:
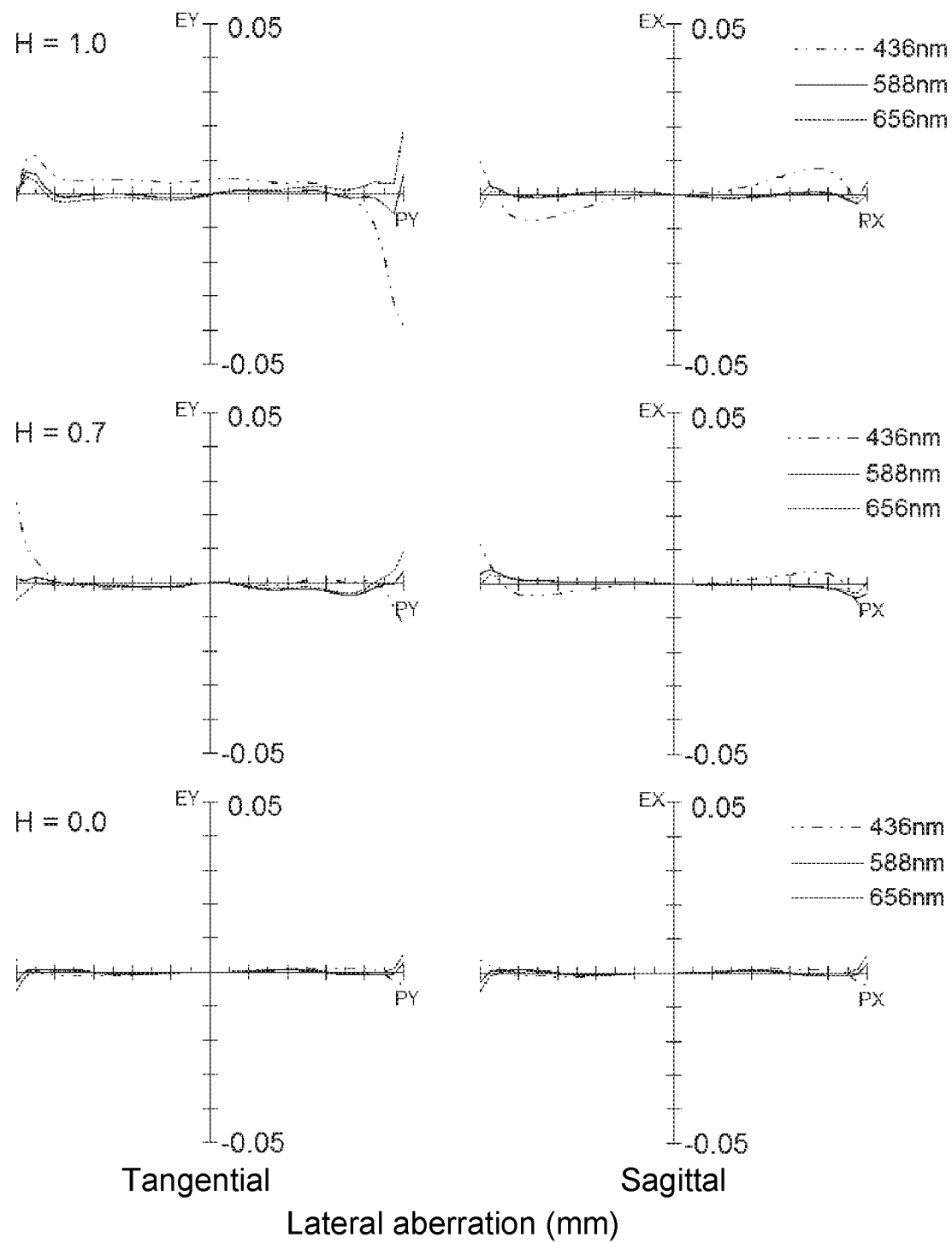
FIG. 2 is an aberration diagram showing a lateral aberration of the imaging lens of FIG. 1.
Figure 3:
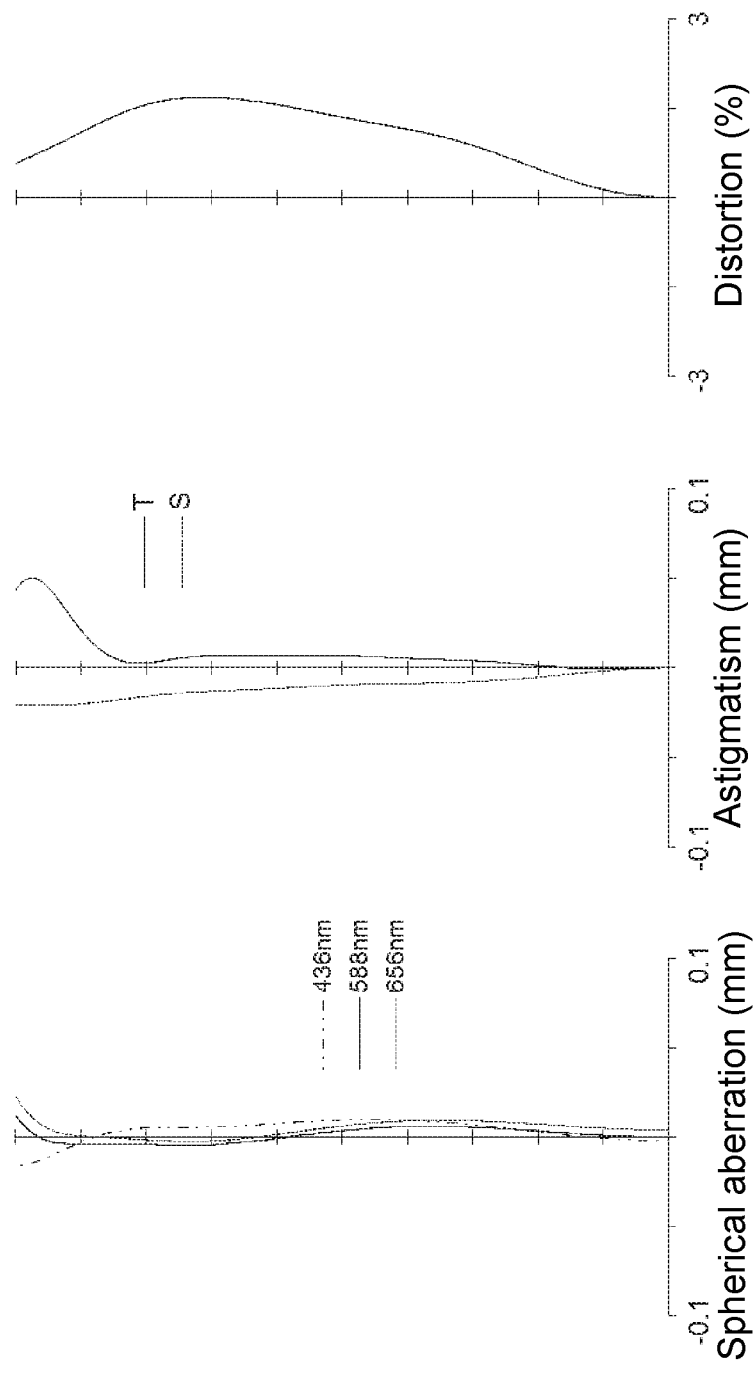
FIG. 3 is an aberration diagram showing a spherical aberration, astigmatism, and a distortion of the imaging lens of FIG. 1.
Figure 4:
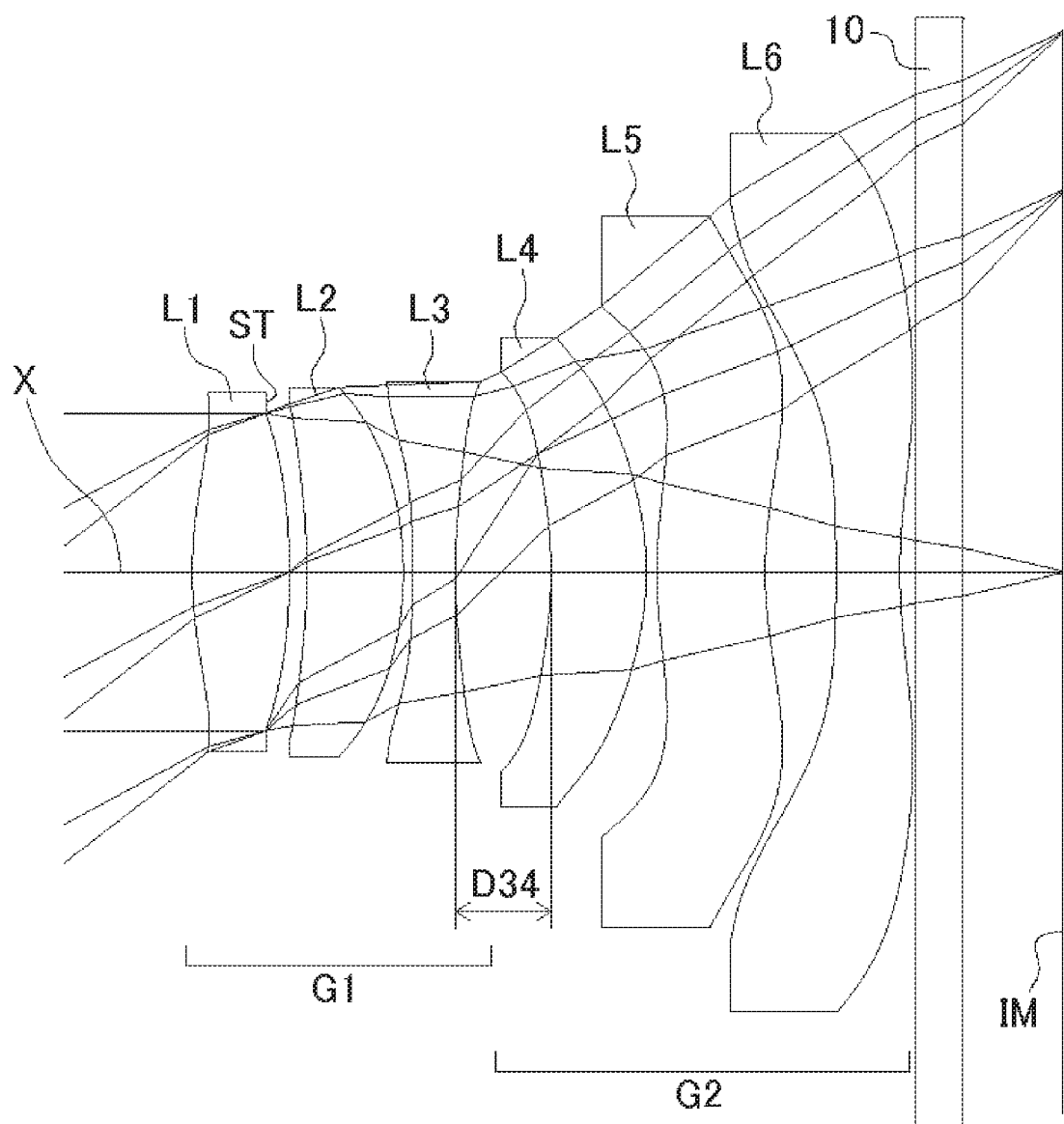
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height (hereinafter referred to as "image height ratio H"), which is divided into a tangential direction and a sagittal direction (The same is true for FIGS. 5, 8, 11, 14, 17, and 20). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, 18, and 21). As shown in FIGS. 2 and 3, according to the imaging lens of Numerical Data Example 1, the aberrations are satisfactorily corrected.

NUMERICAL DATA EXAMPLE 2

Basic data are shown below.
f = 4.41 mm, Fno = 2.2, ω = 37.7°
Unit: mm

Surface Data

| Surface Number i | r | d | nd | vd |
|---|---|---|---|---|
| (Object) | ∞ | ∞ | | |
| 1* | 2.777 | 0.614 | 1.5346 | 56.1(=vd1) |
| 2*(Stop) | −4.101 | 0.109 | | |
| 3* | −4.097 | 0.608 | 1.5346 | 56.1(=vd2) |
| 4* | −2.280 | 0.059 | | |
| 5* | −10.179 | 0.269 | 1.6355 | 24.0(=vd3) |
| 6* | 3.839 | 0.605(=D34) | | |
| 7* | −2.637 | 0.600 | 1.6142 | 26.0(=vd4) |
| 8* | −2.032 | 0.068 | | |
| 9* | 2.867 | 0.683 | 1.5346 | 56.1(=vd5) |
| 10* | 2.495 | 0.447 | | |
| 11* | −20.730 | 0.404 | 1.5346 | 56.1(=vd6) |
| 12* | 3.320 | 0.100 | | |
| 13 | ∞ | 0.300 | 1.5168 | 64.2 |
| 14 | ∞ | 0.631 | | |
| (Image plane) | ∞ | | | |

Aspheric Surface Data

First Surface k = 0.000, $A_4$ = −4.774E−02, $A_6$ = −5.967E−03, $A_8$ = −4.342E−02,
$A_{10}$ = 2.143E−02, $A_{12}$ = 1.020E−02, $A_{14}$ = −2.197E−02,
$A_{16}$ = 9.790E−03
Second Surface k = 0.000, $A_4$ = −2.032E−02, $A_6$ = 2.834E−03, $A_8$ = −2.865E−02,
$A_{10}$ = 1.925E−02, $A_{12}$ = 2.745E−02, $A_{14}$ = −5.163E−02,
$A_{16}$ = 2.546E−02
Third Surface k = 0.000, $A_4$ = 4.925E−02, $A_6$ = −1.824E−02, $A_8$ = 2.665E−02,
$A_{10}$ = −5.057E−02, $A_{12}$ = 2.260E−02, $A_{14}$ = −5.001E−03,
$A_{16}$ = 3.403E−03
Fourth Surface k = 0.000, $A_4$ = −2.168E−02, $A_6$ = −2.133E−02, $A_8$ = 2.034E−03,
$A_{10}$ = 3.010E−04, $A_{12}$ = −6.787E−04, $A_{14}$ = 1.226E−03,
$A_{16}$ = −6.058E−04

-continued

Basic data are shown below.
f = 4.41 mm, Fno = 2.2, ω = 37.7°
Unit: mm

Fifth Surface k = 0.000, $A_4$ = −1.521E−01, $A_6$ = 4.348E−02, $A_8$ = 2.402E−02,
$A_{10}$ = −4.407E−06, $A_{12}$ = 1.329E−02, $A_{14}$ = −1.460E−02,
$A_{16}$ = 3.374E−03
Sixth Surface k = 0.000, $A_4$ = −8.509E−02, $A_6$ = 4.221E−02, $A_8$ = 2.434E−03,
$A_{10}$ = 3.010E−03, $A_{12}$ = −6.542E−03, $A_{14}$ = 6.412E−03,
$A_{16}$ = −1.976E−03
Seventh Surface k = 0.000, $A_4$ = 1.270E−01, $A_6$ = −1.213E−01, $A_8$ = 8.665E−02,
$A_{10}$ = −5.967E−02, $A_{12}$ = 8.844E−03, $A_{14}$ = 5.705E−03,
$A_{16}$ = −1.522E−03
Eighth Surface k = 0.000, $A_4$ = 2.921E−02, $A_6$ = 1.518E−02, $A_8$ = −1.487E−02,
$A_{10}$ = 1.128E−03, $A_{12}$ = −1.116E−03, $A_{14}$ = 2.385E−04,
$A_{16}$ = 2.474E−04
Ninth Surface k = 0.000, $A_4$ = −1.551E−01, $A_6$ = 5.179E−02, $A_8$ = −1.993E−02,
$A_{10}$ = 2.061E−03, $A_{12}$ = −3.480E−04, $A_{14}$ = 1.802E−04,
$A_{16}$ = −2.742E−06
Tenth Surface k = 0.000, $A_4$ = −1.238E−01, $A_6$ = 2.829E−02, $A_8$ = −8.372E−03,
$A_{10}$ = 8.973E−04, $A_{12}$ = 2.093E−04, $A_{14}$ = −5.173E−05,
$A_{16}$ = 2.629E−06
Eleventh Surface k = 0.000, $A_4$ = −8.760E−02, $A_6$ = 1.537E−02, $A_8$ = 2.183E−04,
$A_{10}$ = 2.367E−05, $A_{12}$ = −5.823E−05, $A_{14}$ = 6.483E−06,
$A_{16}$ = −1.607E−07
Twelfth Surface k = 0.000, $A_4$ = −9.780E−02, $A_6$ = 2.510E−02, $A_8$ = −3.643E−03,
$A_{10}$ = 1.965E−04, $A_{12}$ = 8.839E−06, $A_{14}$ = −1.712E−06,
$A_{16}$ = 6.852E−08 f1 = 3.20 mm
f2 = 8.61 mm
f3 = −4.35 mm
f4 = 10.46 mm
f5 = −99.88 mm
f6 = −5.32 mm
f56 = −5.45 mm
F1 = 4.62 mm
F2 = −13.81 mm

The Values of the Respective Conditional Expressions are as Follows:

$f1/f2$=0.37

$F1/f$=1.05

$f2/f$=1.95

$f1/f3$=−0.73

$F2/F1$=−2.99

$D34/f$=0.14

$f5/f4$=−9.55

$f56/f$=−1.24

$f6/f56$=0.98

$f6/f$=−1.21

Accordingly, the imaging lens of Numerical Data Example 2 satisfies the above-described conditional expressions. The distance on the optical axis X from the object-side surface of the first lens L1 to the image plane IM (length without the filter 10) is 5.39 mm, and downsizing of the imaging lens is attained.

Figure 5:
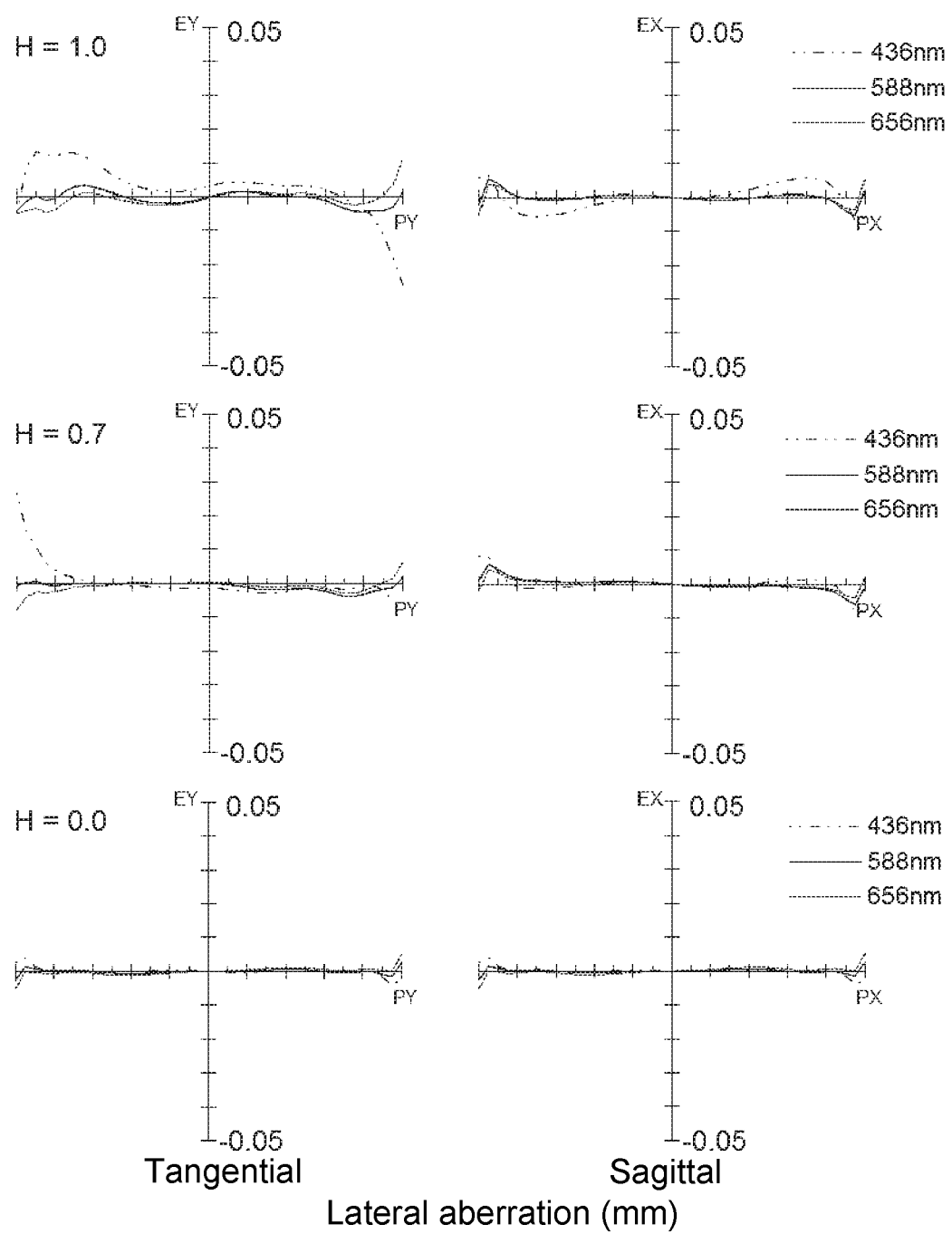
FIG. 5 is an aberration diagram showing a lateral aberration of the imaging lens of FIG. 4.
Figure 6:
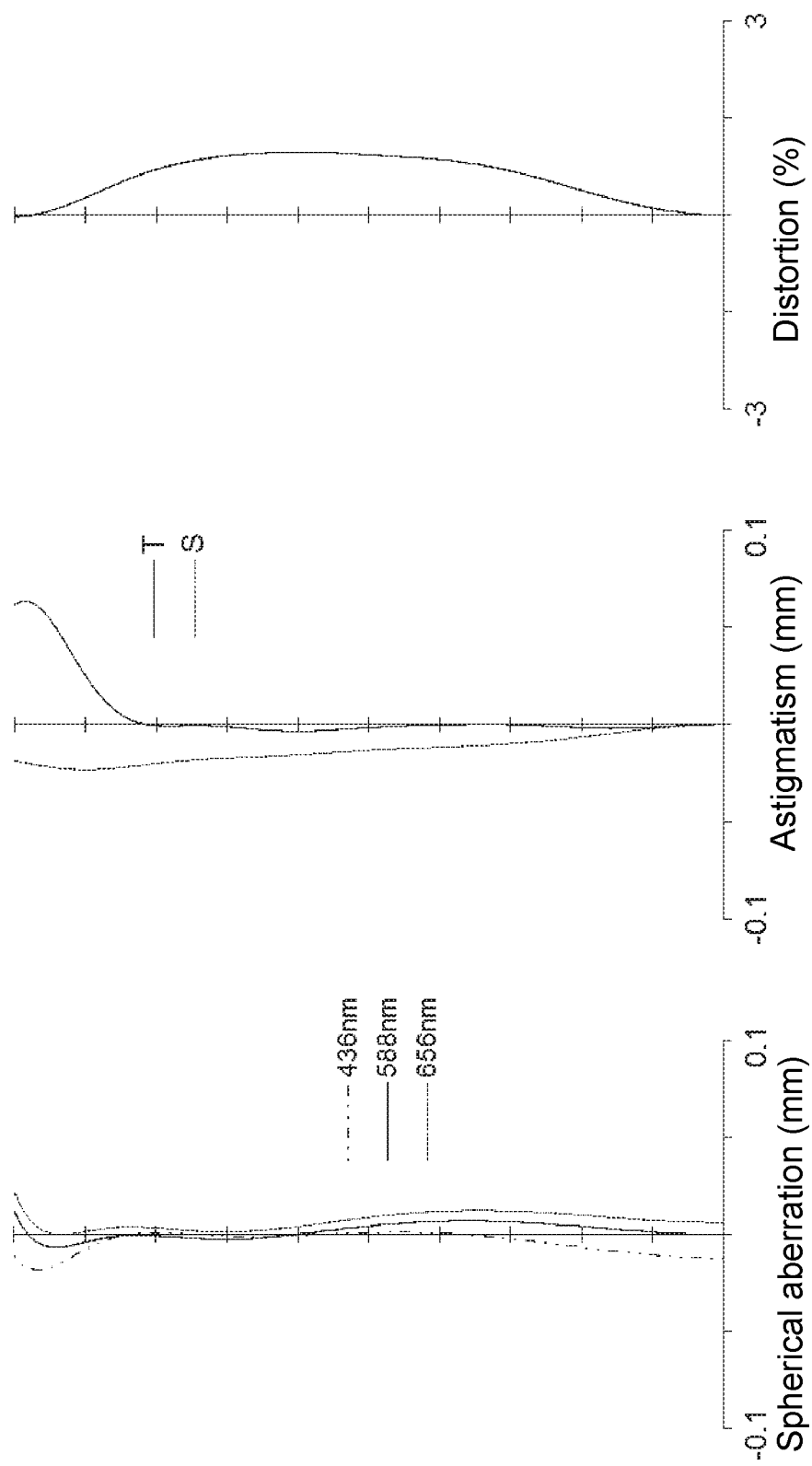
FIG. 6 is an aberration diagram showing a spherical aberration, astigmatism, and a distortion of the imaging lens of FIG. 4.
Figure 7:
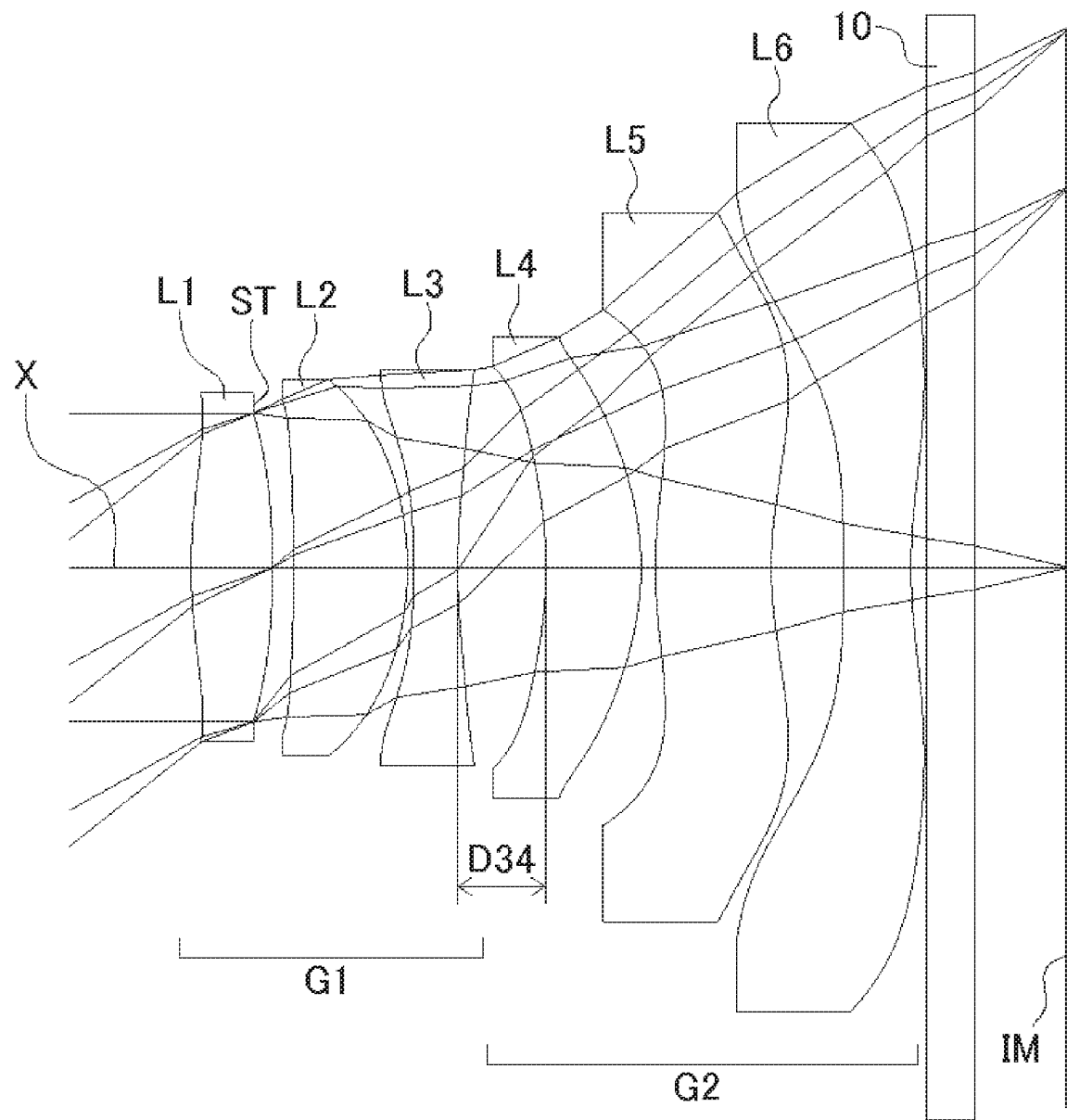
FIG. 7 shows a sectional view of a schematic configuration of an imaging lens in Numerical Data Example 3 according to the embodiment of the present invention.

FIG. 5 shows a lateral aberration that corresponds to the image height ratio H, and FIG. 6 shows a spherical aberration (mm), astigmatism (mm), and a distortion (%), respectively, of the imaging lens of Numerical Data Example 2. As shown in FIGS. 5 and 6, according to the imaging lens of Numerical Data Example 2, the aberrations are also satisfactorily corrected.

NUMERICAL DATA EXAMPLE 3

Basic data are shown below.
f = 4.29 mm, Fno = 2.2, ω = 38.5°
Unit: mm

Surface Data

| Surface Number i | r | d | nd | vd |
|---|---|---|---|---|
| (Object) | ∞ | ∞ | | |
| 1* | 3.463 | 0.516 | 1.5346 | 56.1(=vd1) |
| 2*(Stop) | −5.004 | 0.134 | | |
| 3* | −9.355 | 0.720 | 1.5346 | 56.1(=vd2) |
| 4* | −1.972 | 0.039 | | |
| 5* | −5.603 | 0.279 | 1.6355 | 24.0(=vd3) |
| 6* | 4.021 | 0.561(=D34) | | |
| 7* | −2.442 | 0.600 | 1.6142 | 26.0(=vd4) |
| 8* | −1.891 | 0.091 | | |
| 9* | 2.907 | 0.734 | 1.5346 | 56.1(=vd5) |
| 10* | 2.515 | 0.457 | | |
| 11* | −16.090 | 0.427 | 1.5346 | 56.1(=vd6) |
| 12* | 3.316 | 0.100 | | |
| 13 | ∞ | 0.300 | 1.5168 | 64.2 |
| 14 | ∞ | 0.584 | | |
| (Image plane) | ∞ | | | |

Aspheric Surface Data

First Surface k = 0.000, $A_4$ = −5.535E−02, $A_6$ = −1.917E−03, $A_8$ = −3.996E−02,
$A_{10}$ = 2.333E−02, $A_{12}$ = 1.081E−02, $A_{14}$ = −2.193E−02,
$A_{16}$ = 9.435E−03
Second Surface k = 0.000, $A_4$ = −2.325E−02, $A_6$ = 2.571E−03, $A_8$ = −2.870E−02,
$A_{10}$ = 1.924E−02, $A_{12}$ = 2.771E−02, $A_{14}$ = −5.110E−02,
$A_{16}$ = 2.623E−02
Third Surface k = 0.000, $A_4$ = 3.729E−02, $A_6$ = −2.472E−02, $A_8$ = 2.208E−02,
$A_{10}$ = −5.372E−02, $A_{12}$ = 2.066E−02, $A_{14}$ = −5.735E−03,
$A_{16}$ = 3.828E−03
Fourth Surface k = 0.000, $A_4$ = −1.774E−02, $A_6$ = −2.120E−02, $A_8$ = 2.435E−03,
$A_{10}$ = 2.765E−04, $A_{12}$ = −1.088E−03, $A_{14}$ = 8.235E−04,
$A_{16}$ = −8.619E−04
Fifth Surface k = 0.000, $A_4$ = −1.499E−01, $A_6$ = 4.691E−02, $A_8$ = 2.405E−02,
$A_{10}$ = −6.608E−04, $A_{12}$ = 1.293E−02, $A_{14}$ = −1.463E−02,
$A_{16}$ = 3.594E−03
Sixth Surface k = 0.000, $A_4$ = −9.285E−02, $A_6$ = 3.888E−02, $A_8$ = −1.381E−04,
$A_{10}$ = 1.635E−03, $A_{12}$ = −6.993E−03, $A_{14}$ = 6.317E−03,
$A_{16}$ = −2.025E−03

-continued

Basic data are shown below.
f = 4.29 mm, Fno = 2.2, ω = 38.5°
Unit: mm

Seventh Surface k = 0.000, $A_4$ = 1.345E−01, $A_6$ = −1.210E−01, $A_8$ = 8.433E−02,
$A_{10}$ = −5.928E−02, $A_{12}$ = 9.524E−03, $A_{14}$ = 5.904E−03,
$A_{16}$ = −1.696E−03
Eighth Surface k = 0.000, $A_4$ = 3.338E−02, $A_6$ = 1.778E−02, $A_8$ = −1.402E−02,
$A_{10}$ = 1.194E−03, $A_{12}$ = −1.082E−03, $A_{14}$ = 2.965E−04,
$A_{16}$ = 2.943E−04
Ninth Surface k = 0.000, $A_4$ = −1.536E−01, $A_6$ = 5.270E−02, $A_8$ = −2.085E−02,
$A_{10}$ = 2.263E−03, $A_{12}$ = −2.503E−04, $A_{14}$ = 1.772E−04,
$A_{16}$ = −2.603E−05
Tenth Surface k = 0.000, $A_4$ = −1.236E−01, $A_6$ = 2.837E−02, $A_8$ = −8.354E−03,
$A_{10}$ = 8.999E−04, $A_{12}$ = 2.096E−04, $A_{14}$ = −5.171E−05,
$A_{16}$ = 2.609E−06
Eleventh Surface k = 0.000, $A_4$ = −8.659E−02, $A_6$ = 1.540E−02, $A_8$ = 2.172E−04,
$A_{10}$ = 2.345E−05, $A_{12}$ = −5.824E−05, $A_{14}$ = 6.479E−06,
$A_{16}$ = −1.620E−07
Twelfth Surface k = 0.000, $A_4$ = −9.707E−02, $A_6$ = 2.519E−02, $A_8$ = −3.641E−03,
$A_{10}$ = 1.958E−04, $A_{12}$ = 8.746E−06, $A_{14}$ = −1.719E−06,
$A_{16}$ = 6.825E−08 f1 = 3.91 mm
f2 = 4.52 mm
f3 = −3.64 mm
f4 = 9.64 mm
f5 = −100.02 mm
f6 = −5.10 mm
f56 = −5.26 mm
F1 = 4.62 mm
F2 = −15.02 mm

The Values of the Respective Conditional Expressions are as Follows:

$f1/f2$=0.87

$F1/f$=1.08

$f2/f$=1.05

$f1/f3$=−1.07

$F2/F1$=−3.25

$D34/f$=0.13

$f5/f4$=−10.38

$f56/f$=−1.23

$f6/f56$=0.97

$f6/f$=−1.19

Accordingly, the imaging lens of Numerical Data Example 3 satisfies the above-described conditional expressions. The distance on the optical axis X from the object-side surface of the first lens L1 to the image plane IM (length without the filter 10) is 5.44 mm, and downsizing of the imaging lens is attained.

Figure 8:
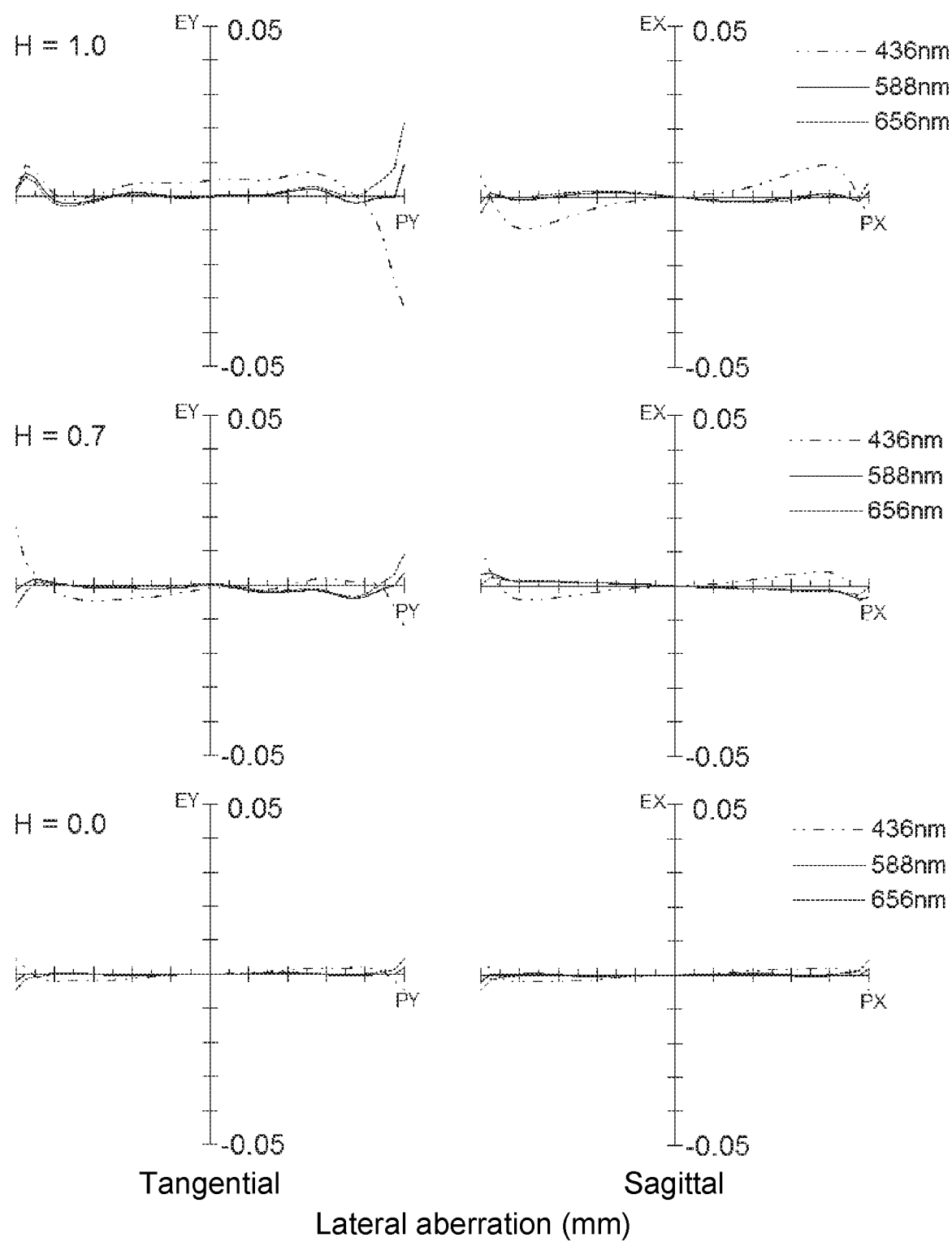
FIG. 8 is an aberration diagram showing a lateral aberration of the imaging lens of FIG. 7.
Figure 9:
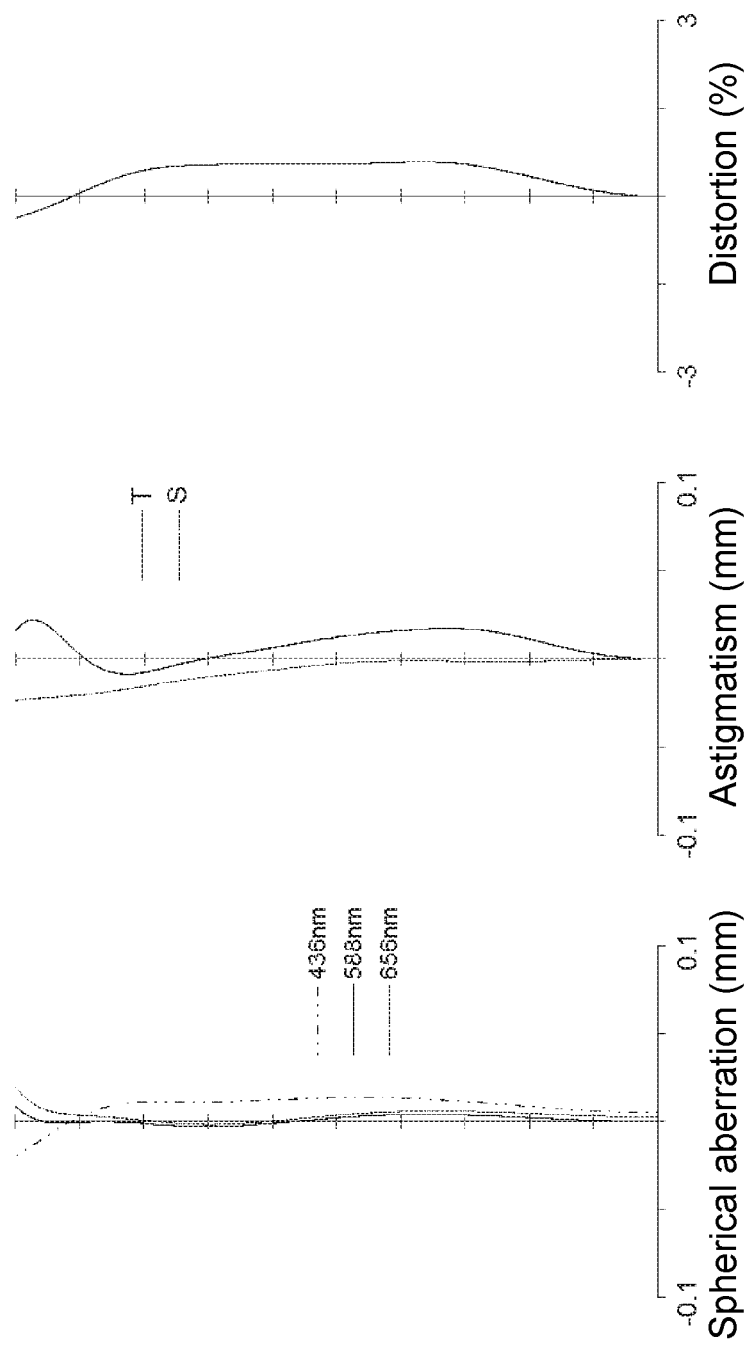
FIG. 9 is an aberration diagram showing a spherical aberration, astigmatism, and a distortion of the imaging lens of FIG. 7.
Figure 10:
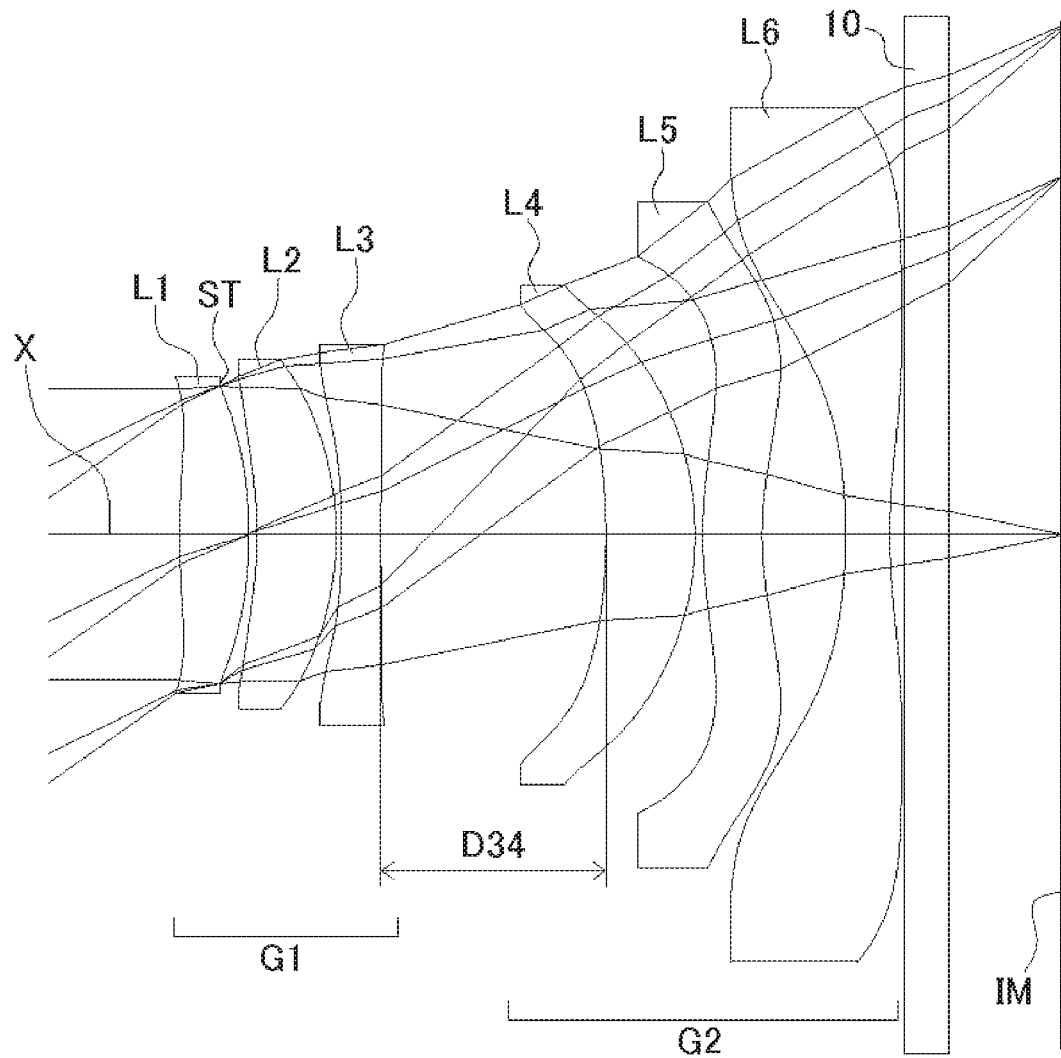
FIG. 10 shows a sectional view of a schematic configuration of an imaging lens in Numerical Data Example 4 according to the embodiment of the present invention.

FIG. 8 shows a lateral aberration that corresponds to the image height ratio H, and FIG. 9 shows a spherical aberration (mm), astigmatism (mm), and a distortion (%), respectively, of the imaging lens of Numerical Data Example 3. As shown in FIGS. 8 and 9, according to the imaging lens of Numerical Data Example 3, the aberrations are also satisfactorily corrected.

NUMERICAL DATA EXAMPLE 4

Basic data are shown below.
f = 4.81 mm, Fno = 2.4, ω = 35.4°
Unit: mm

Surface Data

| Surface Number i | r | d | nd | vd |
|---|---|---|---|---|
| (Object) | ∞ | ∞ | | |
| 1* | 5.003 | 0.467 | 1.5346 | 56.1(=vd1) |
| 2*(Stop) | −3.110 | 0.054 | | |
| 3* | −3.109 | 0.536 | 1.5346 | 56.1(=vd2) |
| 4* | −2.013 | 0.037 | | |
| 5* | −5.259 | 0.263 | 1.6355 | 24.0(=vd3) |
| 6* | 11.775 | 1.520(=D34) | | |
| 7* | −4.054 | 0.600 | 1.6142 | 26.0(=vd4) |
| 8* | −2.156 | 0.050 | | |
| 9* | 2.732 | 0.403 | 1.5346 | 56.1(=vd5) |
| 10* | 2.446 | 0.561 | | |
| 11* | −4.624 | 0.299 | 1.5346 | 56.1(=vd6) |
| 12* | 3.817 | 0.100 | | |
| 13 | ∞ | 0.300 | 1.5168 | 64.2 |
| 14 | ∞ | 0.749 | | |
| (Image plane) | ∞ | | | |

Aspheric Surface Data

First Surface k = 0.000, $A_4$ = −6.785E−02, $A_6$ = −2.546E−02, $A_8$ = −5.158E−02,
$A_{10}$ = 2.913E−02, $A_{12}$ = 1.851E−02, $A_{14}$ = −3.233E−03,
$A_{16}$ = −6.237E−03
Second Surface k = 0.000, $A_4$ = −4.128E−02, $A_6$ = 2.090E−02, $A_8$ = −2.933E−02,
$A_{10}$ = 1.718E−02, $A_{12}$ = 3.764E−02, $A_{14}$ = −4.577E−02,
$A_{16}$ = 1.311E−02
Third Surface k = 0.000, $A_4$ = 4.816E−02, $A_6$ = 1.829E−03, $A_8$ = 4.290E−02,
$A_{10}$ = −5.132E−02, $A_{12}$ = 2.010E−02, $A_{14}$ = −7.058E−03,
$A_{16}$ = −9.970E−05
Fourth Surface k = 0.000, $A_4$ = 4.722E−02, $A_6$ = −5.688E−02, $A_8$ = 1.907E−02,
$A_{10}$ = 4.455E−03, $A_{12}$ = −1.312E−03, $A_{14}$ = −4.132E−04,
$A_{16}$ = −1.302E−03
Fifth Surface k = 0.000, $A_4$ = −7.379E−02, $A_6$ = 2.892E−02, $A_8$ = 1.504E−02,
$A_{10}$ = −1.198E−03, $A_{12}$ = 1.372E−02, $A_{14}$ = −1.442E−02,
$A_{16}$ = 3.305E−03
Sixth Surface k = 0.000, $A_4$ = −8.338E−02, $A_6$ = 4.790E−02, $A_8$ = 1.388E−03,
$A_{10}$ = 4.645E−04, $A_{12}$ = −8.286E−03, $A_{14}$ = 6.082E−03,
$A_{16}$ = −1.545E−03
Seventh Surface k = 0.000, $A_4$ = 9.206E−03, $A_6$ = −9.210E−02, $A_8$ = 1.030E−01,
$A_{10}$ = −5.866E−02, $A_{12}$ = 6.350E−03, $A_{14}$ = 4.505E−03,
$A_{16}$ = −9.761E−04
Eighth Surface k = 0.000, $A_4$ = −2.031E−02, $A_6$ = 2.042E−02, $A_8$ = −1.129E−02,
$A_{10}$ = 2.128E−03, $A_{12}$ = −8.758E−04, $A_{14}$ = 1.371E−04,
$A_{16}$ = 5.360E−05

-continued

Basic data are shown below.
f = 4.81 mm, Fno = 2.4, ω = 35.4°
Unit: mm

Ninth Surface k = 0.000, $A_4$ = −1.440E−01, $A_6$ = 6.840E−02, $A_8$ = −3.271E−02,
$A_{10}$ = 7.023E−03, $A_{12}$ = −5.822E−04, $A_{14}$ = 2.376E−05,
$A_{16}$ = −8.656E−06
Tenth Surface k = 0.000, $A_4$ = −1.131E−01, $A_6$ = 2.256E−02, $A_8$ = −8.356E−03,
$A_{10}$ = 1.036E−03, $A_{12}$ = 2.169E−04, $A_{14}$ = −5.279E−05,
$A_{16}$ = 2.337E−06
Eleventh Surface k = 0.000, $A_4$ = −6.799E−02, $A_6$ = 1.453E−02, $A_8$ = 1.346E−04,
$A_{10}$ = 2.693E−05, $A_{12}$ = −5.759E−05, $A_{14}$ = 6.511E−06,
$A_{16}$ = −1.691E−07
Twelfth Surface k = 0.000, $A_4$ = −8.500E−02, $A_6$ = 2.551E−02, $A_8$ = −3.947E−03,
$A_{10}$ = 2.234E−04, $A_{12}$ = 9.589E−06, $A_{14}$ = −1.807E−06,
$A_{16}$ = 6.410E−08 f1 = 3.66 mm
f2 = 9.13 mm
f3 = −5.69 mm
f4 = 6.69 mm
f5 = −85.84 mm
f6 = −3.86 mm
f56 = −3.86 mm
F1 = 5.08 mm
F2 = −13.07 mm

The Values of the Respective Conditional Expressions are as Follows:

$f1/f2$=0.40

$F1/f$=1.06

$f2/f$=1.90

$f1/f3$=−0.64

$F2/F1$=−2.57

$D34/f$=0.32

$f5/f4$=−12.82

$f56/f$=−0.80

$f6/f56$=1.00

$f6/f$=−0.80

Accordingly, the imaging lens of Numerical Data Example 4 satisfies the above-described conditional expressions. The distance on the optical axis X from the object-side surface of the first lens L1 to the image plane IM (length without the filter 10) is 5.84 mm, and downsizing of the imaging lens is attained.

Figure 11:
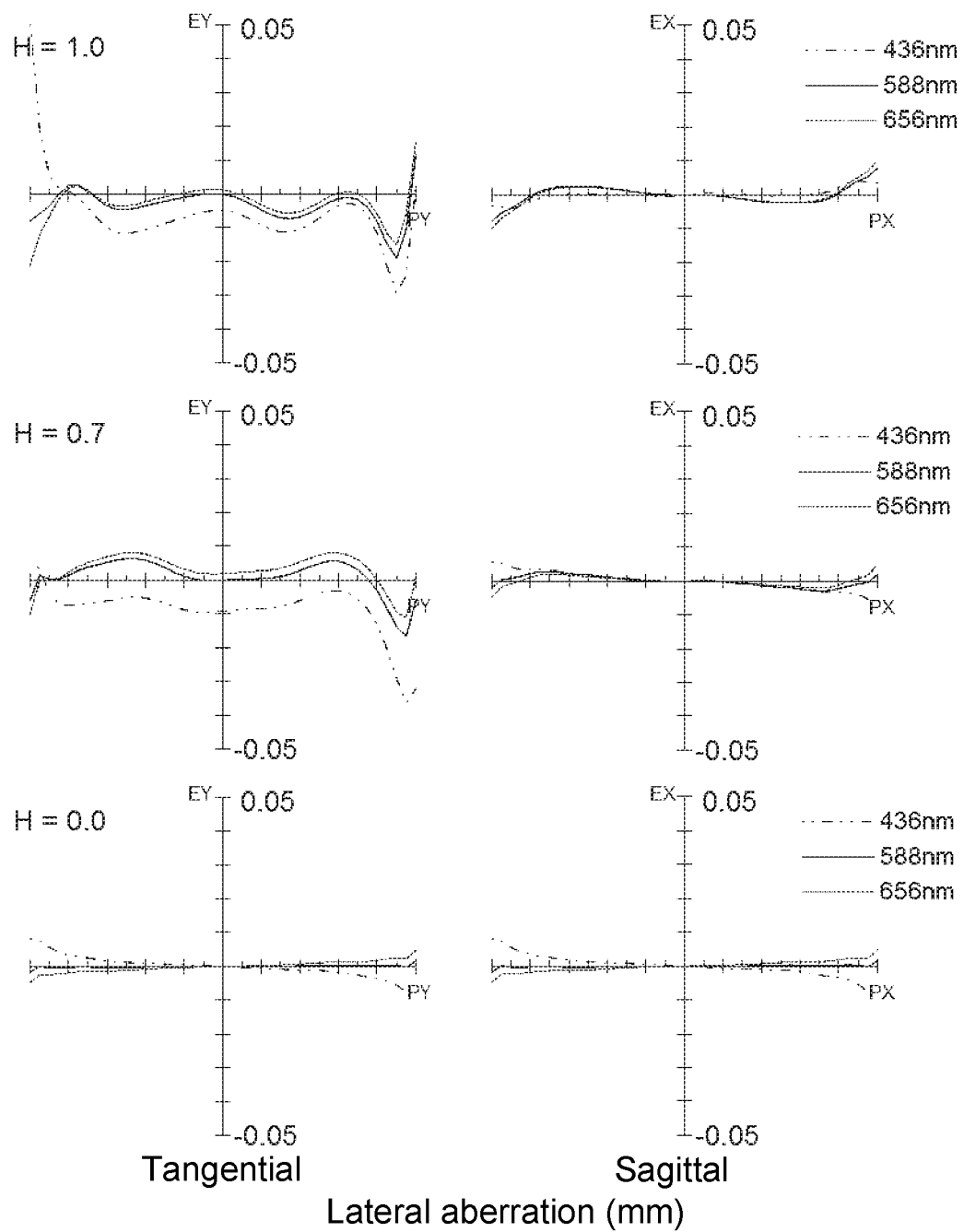
FIG. 11 is an aberration diagram showing a lateral aberration of the imaging lens of FIG. 10.
Figure 12:
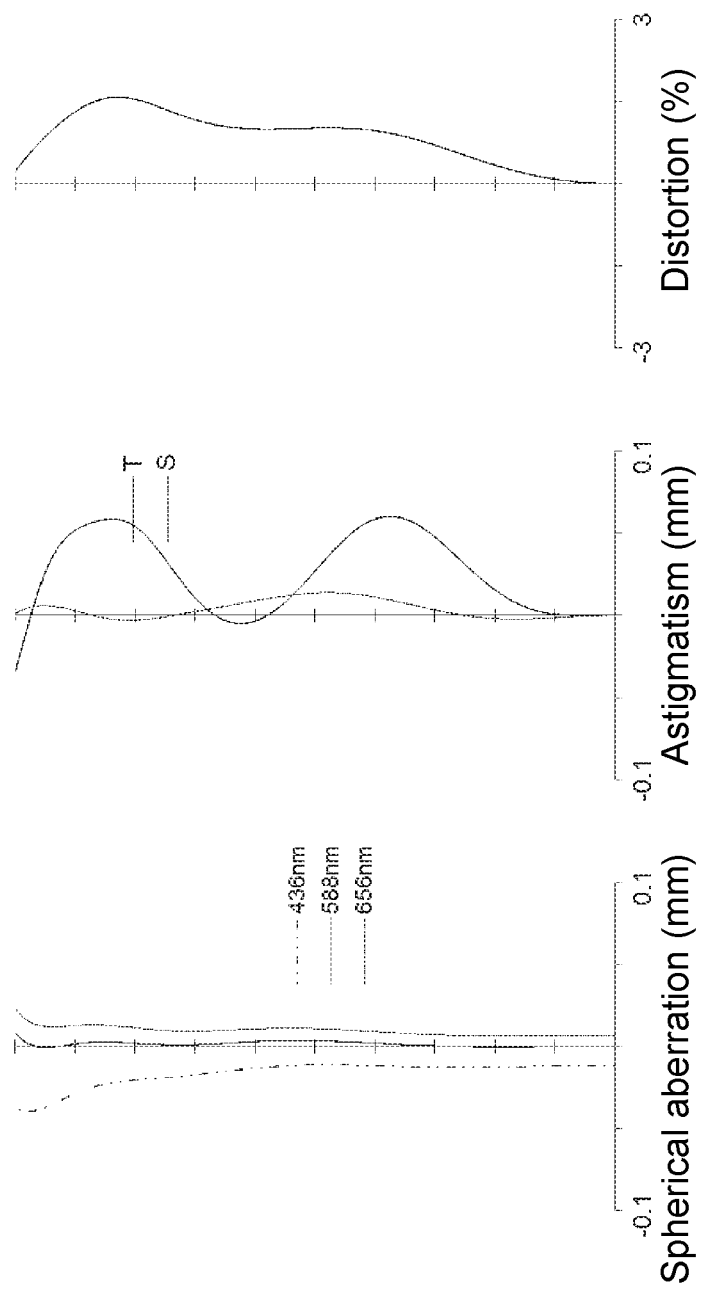
FIG. 12 is an aberration diagram showing a spherical aberration, astigmatism, and a distortion of the imaging lens of FIG. 10.
Figure 13:
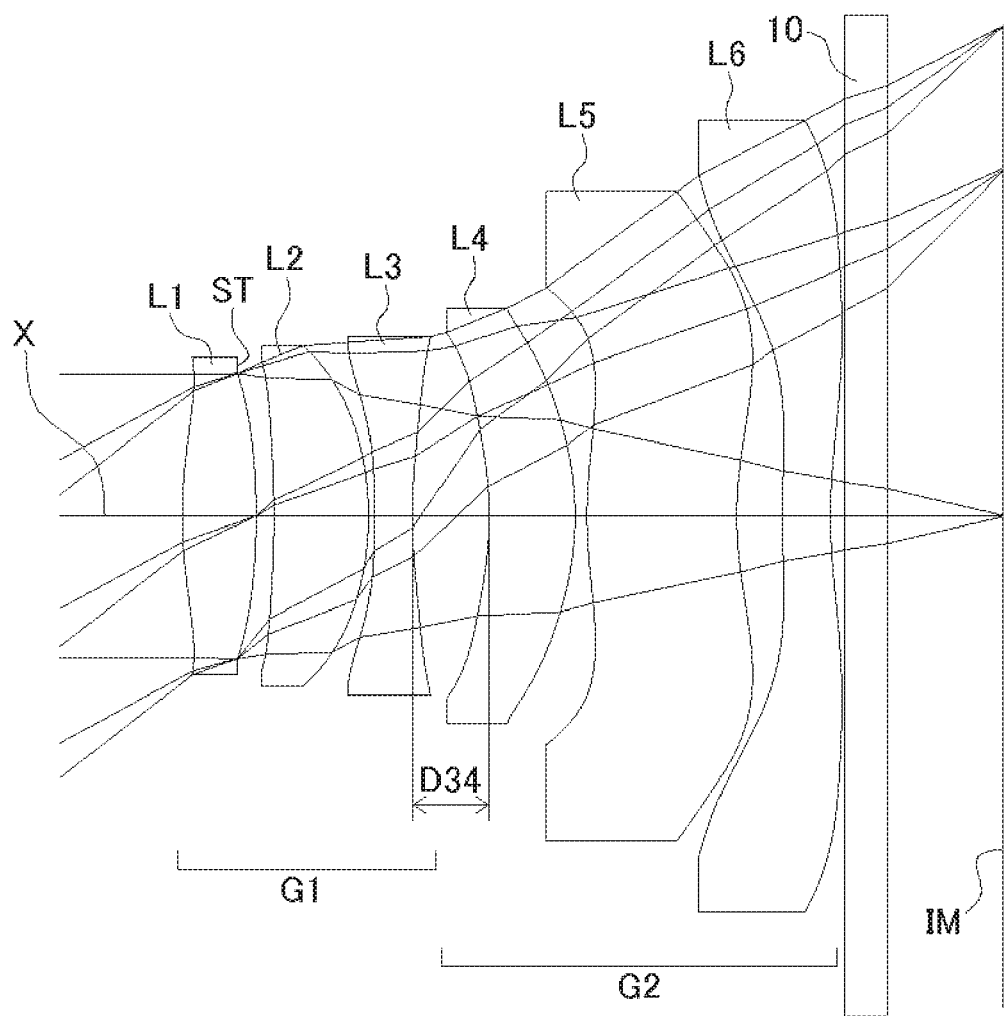
FIG. 13 shows a sectional view of a schematic configuration of an imaging lens in Numerical Data Example 5 according to the embodiment of the present invention.

FIG. 11 shows a lateral aberration that corresponds to the image height ratio H, and FIG. 12 shows a spherical aberration (mm), astigmatism (mm), and a distortion (%), respectively, of the imaging lens of Numerical Data Example 4. As shown in FIGS. 11 and 12, according to the imaging lens of Numerical Data Example 4, the aberrations are also satisfactorily corrected.

NUMERICAL DATA EXAMPLE 5

Basic data are shown below.
f = 4.37 mm, Fno = 2.2, ω = 37.9°
Unit: mm

Surface Data

| Surface Number i | r | d | nd | vd |
|---|---|---|---|---|
| (Object) | ∞ | ∞ | | |
| 1* | 3.241 | 0.516 | 1.5346 | 56.1(=vd1) |
| 2*(Stop) | −4.985 | 0.126 | | |
| 3* | −6.668 | 0.661 | 1.5346 | 56.1(=vd2) |
| 4* | −2.148 | 0.039 | | |
| 5* | −8.367 | 0.266 | 1.6355 | 24.0(=vd3) |
| 6* | 3.795 | 0.537(=D34) | | |
| 7* | −2.277 | 0.600 | 1.6142 | 26.0(=vd4) |
| 8* | −2.121 | 0.079 | | |
| 9* | 2.976 | 1.046 | 1.5346 | 56.1(=vd5) |
| 10* | 2.478 | 0.323 | | |
| 11* | 8.693 | 0.333 | 1.5346 | 56.1(=vd6) |
| 12* | 3.718 | 0.100 | | |
| 13 | ∞ | 0.300 | 1.5168 | 64.2 |
| 14 | ∞ | 0.804 | | |
| (Image plane) | ∞ | | | |

Aspheric Surface Data

First Surface k = 0.000, $A_4$ = −5.240E−02, $A_6$ = −3.561E−03, $A_8$ = −4.105E−02,
$A_{10}$ = 2.229E−02, $A_{12}$ = 1.015E−02, $A_{14}$ = −2.219E−02,
$A_{16}$ = 9.826E−03
Second Surface k = 0.000, $A_4$ = −2.277E−02, $A_6$ = 1.217E−03, $A_8$ = −2.958E−02,
$A_{10}$ = 1.920E−02, $A_{12}$ = 2.777E−02, $A_{14}$ = −5.131E−02,
$A_{16}$ = 2.531E−02
Third Surface k = 0.000, $A_4$ = 4.057E−02, $A_6$ = −2.331E−02, $A_8$ = 2.368E−02,
$A_{10}$ = −5.191E−02, $A_{12}$ = 2.219E−02, $A_{14}$ = −5.065E−03,
$A_{16}$ = 3.361E−03
Fourth Surface k = 0.000, $A_4$ = −1.999E−02, $A_6$ = −2.216E−02, $A_8$ = 2.362E−03,
$A_{10}$ = 6.018E−04, $A_{12}$ = −7.646E−04, $A_{14}$ = 9.933E−04,
$A_{16}$ = −7.473E−04
Fifth Surface k = 0.000, $A_4$ = −1.534E−01, $A_6$ = 4.334E−02, $A_8$ = 2.356E−02,
$A_{10}$ = −2.008E−04, $A_{12}$ = 1.323E−02, $A_{14}$ = −1.464E−02,
$A_{16}$ = 3.390E −03
Sixth Surface k = 0.000, $A_4$ = −9.060E−02, $A_6$ = 3.803E−02, $A_8$ = 1.636E−04,
$A_{10}$ = 2.065E−03, $A_{12}$ = −6.810E−03, $A_{14}$ = 6.321E−03,
$A_{16}$ = −2.083E−03
Seventh Surface k = 0.000, $A_4$ = 1.571E−01, $A_6$ = −1.266E−01, $A_8$ = 8.500E−02,
$A_{10}$ = −5.769E−02, $A_{12}$ = 1.034E−02, $A_{14}$ = 6.048E−03,
$A_{16}$ = −1.843E−03
Eighth Surface k = 0.000, $A_4$ = 2.079E−02, $A_6$ = 1.705E−02, $A_8$ = −1.366E−02,
$A_{10}$ = 1.449E−03, $A_{12}$ = −1.039E−03, $A_{14}$ = 2.668E−04,
$A_{16}$ = 2.576E−04
Ninth Surface k = 0.000, $A_4$ = −1.522E−01, $A_6$ = 5.417E−02, $A_8$ = −2.064E−02,
$A_{10}$ = 1.903E−03, $A_{12}$ = −3.774E−04, $A_{14}$ = 1.755E−04,
$A_{16}$ = −5.240E−07

-continued

Basic data are shown below.
f = 4.37 mm, Fno = 2.2, ω = 37.9°
Unit: mm

Tenth Surface k = 0.000, $A_4$ = −1.234E−01, $A_6$ = 2.856E−02, $A_8$ = −8.516E−03,
$A_{10}$ = 8.785E−04, $A_{12}$ = 2.087E−04, $A_{14}$ = −5.150E−05,
$A_{16}$ = 2.699E−06
Eleventh Surface k = 0.000, $A_4$ = −1.011E−01, $A_6$ = 1.532E−02, $A_8$ = 2.440E−04,
$A_{10}$ = 2.708E−05, $A_{12}$ = −5.790E−05, $A_{14}$ = 6.509E−06,
$A_{16}$ = −1.589E−07
Twelfth Surface k = 0.000, $A_4$ = −8.566E−02, $A_6$ = 2.416E−02, $A_8$ = −3.640E−03,
$A_{10}$ = 2.008E−04, $A_{12}$ = 9.192E−06, $A_{14}$ = −1.708E−06,
$A_{16}$ = 6.523E−08 f1 = 3.76 mm
f2 = 5.64 mm
f3 = −4.07 mm
f4 = 20.49 mm
f5 = −103.21 mm
f6 = −12.44 mm
f56 = −12.38 mm
F1 = 4.75 mm
F2 = −37.47 mm

The Values of the Respective Conditional Expressions are as Follows:

$f1/f2 = 0.67$ $F1/f = 1.09$ $f2/f = 1.29$ $f1/f3 = -0.92$ $F2/F1 = -7.90$ $D34/f = 0.12$ $f5/f4 = -5.04$ $f56/f = -2.83$ $f6/f56 = 1.01$ $f6/f = -2.85$

Accordingly, the imaging lens of Numerical Data Example 5 satisfies the above-described conditional expressions. The distance on the optical axis X from the object-side surface of the first lens L1 to the image plane IM (length without the filter 10) is 5.63 mm, and downsizing of the imaging lens is attained.

Figure 14:
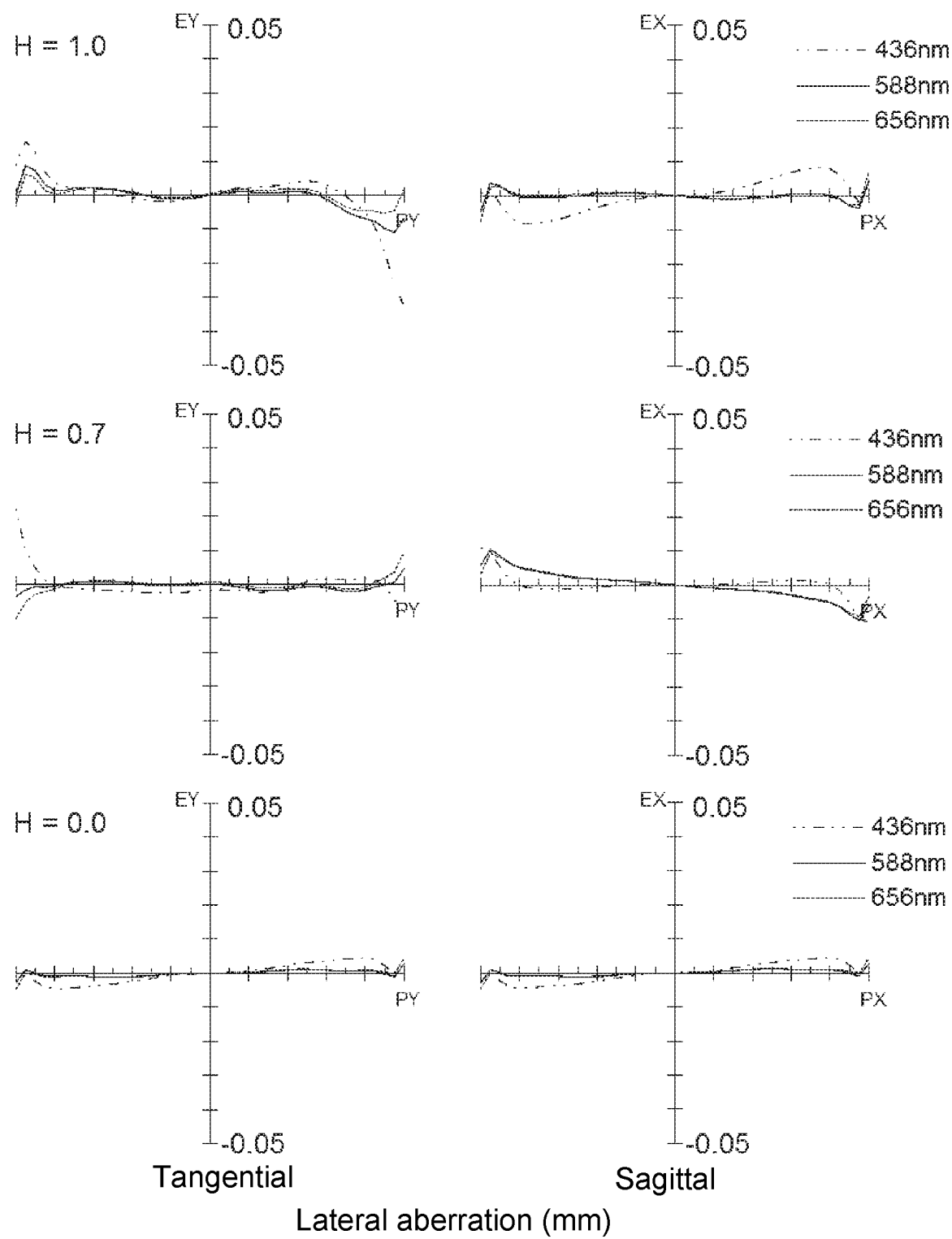
FIG. 14 is an aberration diagram showing a lateral aberration of the imaging lens of FIG. 13.
Figure 15:
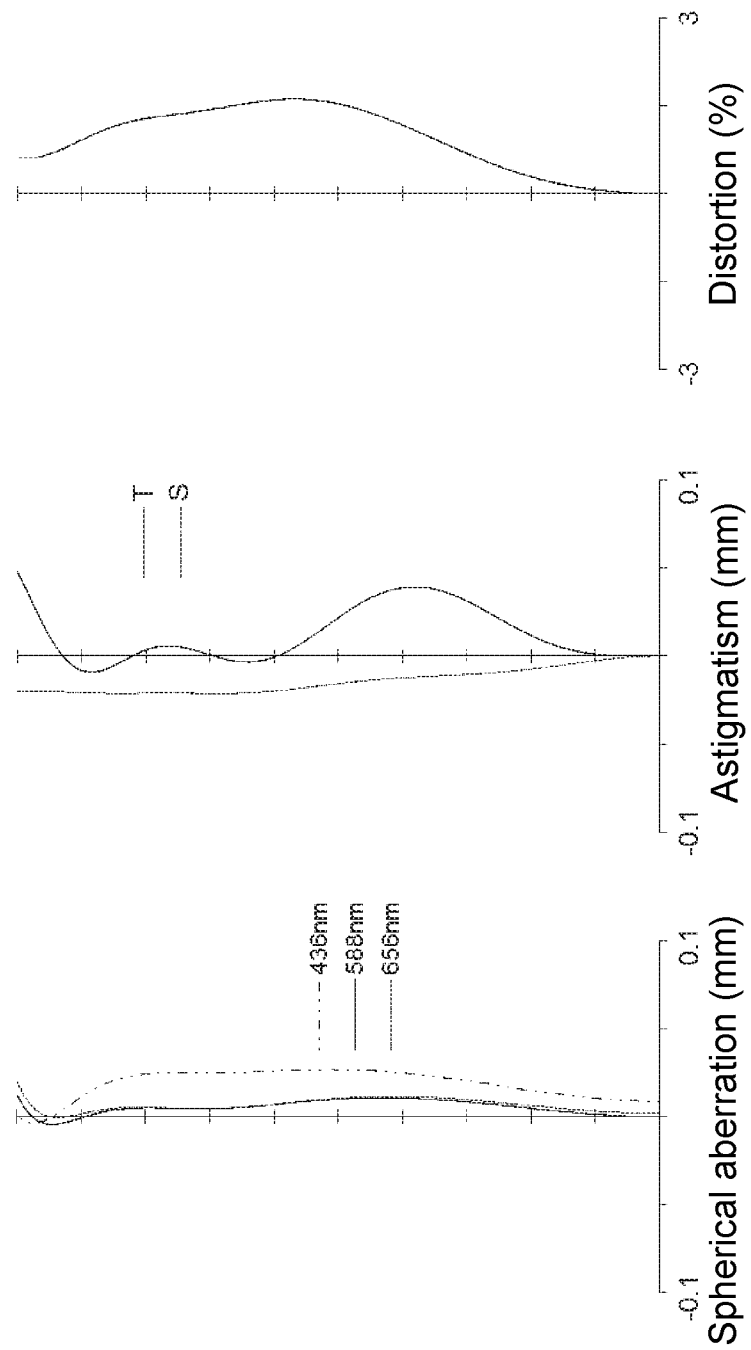
FIG. 15 is an aberration diagram showing a spherical aberration, astigmatism, and a distortion of the imaging lens of FIG. 13.
Figure 16:
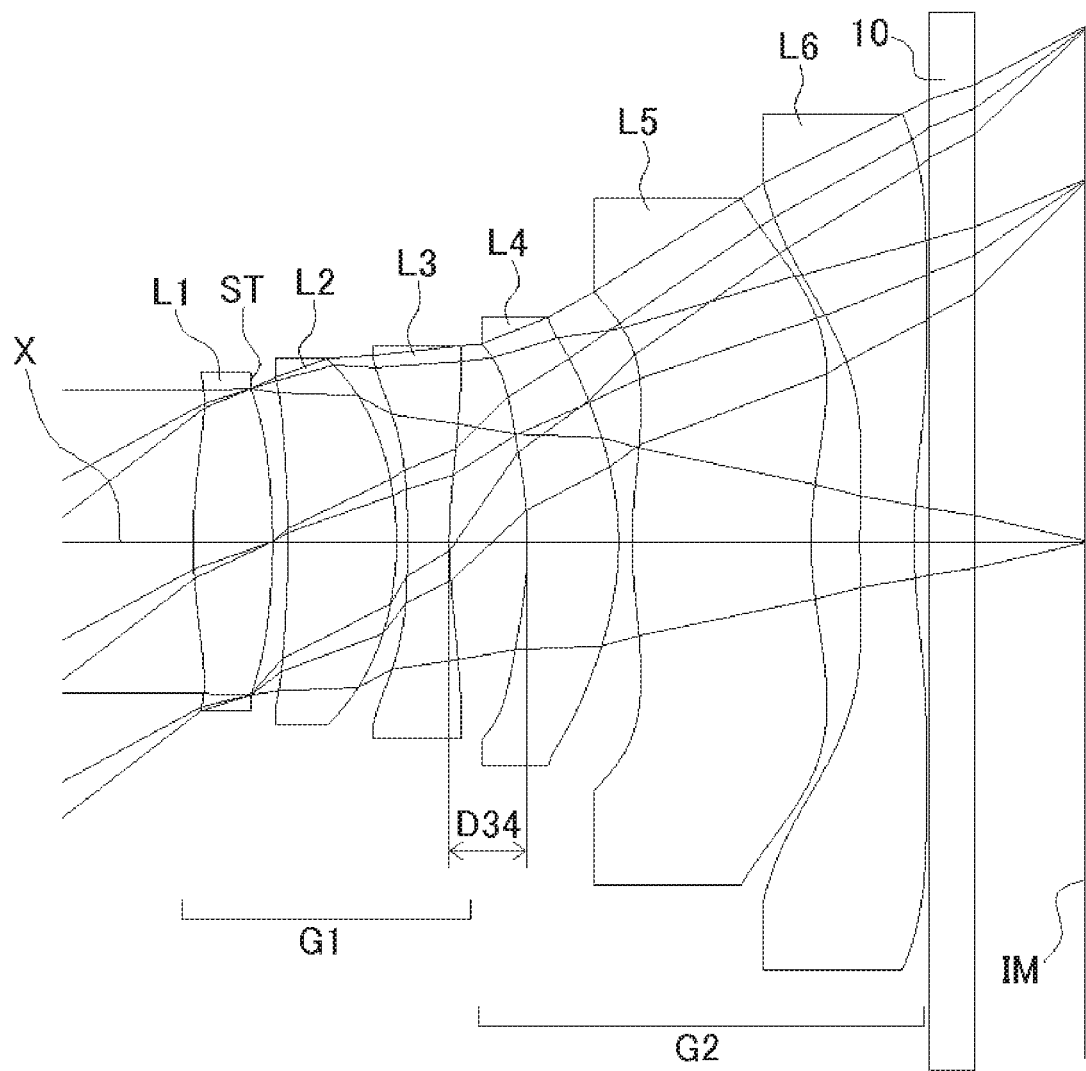
FIG. 16 shows a sectional view of a schematic configuration of an imaging lens in Numerical Data Example 6 according to the embodiment of the present invention.

FIG. 14 shows a lateral aberration that corresponds to the image height ratio H, and FIG. 15 shows a spherical aberration (mm), astigmatism (mm), and a distortion (%), respectively, of the imaging lens of Numerical Data Example 5. As shown in FIGS. 14 and 15, according to the imaging lens of Numerical Data Example 5, the aberrations are also satisfactorily corrected.

NUMERICAL DATA EXAMPLE 6

Basic data are shown below.
f = 4.42 mm, Fno = 2.2, ω = 37.7°
Unit: mm

Surface Data

| Surface Number i | r | d | nd | νd |
|---|---|---|---|---|
| (Object) | ∞ | ∞ | | |
| 1* | 3.438 | 0.525 | 1.5346 | 56.1(=νd1) |
| 2*(Stop) | −5.000 | 0.105 | | |
| 3* | −6.491 | 0.716 | 1.5346 | 56.1(=νd2) |
| 4* | −2.180 | 0.071 | | |
| 5* | −10.432 | 0.279 | 1.6355 | 24.0(=νd3) |
| 6* | 3.495 | 0.518(=D34) | | |
| 7* | −2.260 | 0.600 | 1.6142 | 26.0(=νd4) |
| 8* | −2.082 | 0.091 | | |
| 9* | 3.027 | 1.182 | 1.5346 | 56.1(=νd5) |
| 10* | 2.475 | 0.323 | | |
| 11* | 9.088 | 0.358 | 1.5346 | 56.1(=νd6) |
| 12* | 3.835 | 0.100 | | |
| 13 | ∞ | 0.300 | 1.5168 | 64.2 |
| 14 | ∞ | 0.731 | | |
| (Image plane) | ∞ | | | |

Aspheric Surface Data

First Surface k = 0.000, $A_4$ = −5.124E−02, $A_6$ = −6.397E−03, $A_8$ = −4.038E−02,
$A_{10}$ = 2.150E−02, $A_{12}$ = 8.504E−03, $A_{14}$ = −1.982E−02,
$A_{16}$ = 8.800E−03
Second Surface k = 0.000, $A_4$ = −2.862E−02, $A_6$ = 1.387E−03, $A_8$ = −2.868E−02,
$A_{10}$ = 8.664E−03, $A_{12}$ = 4.090E−02, $A_{14}$ = −5.307E−02,
$A_{16}$ = 2.202E−02
Third Surface k = 0.000, $A_4$ = 3.252E−02, $A_6$ = −1.802E−02, $A_8$ = 2.463E−02,
$A_{10}$ = −5.006E−02, $A_{12}$ = 3.297E−02, $A_{14}$ = −1.385E−02,
$A_{16}$ = 4.260E−03
Fourth Surface k = 0.000, $A_4$ = −1.717E−02, $A_6$ = −1.864E−02, $A_8$ = 3.377E−04,
$A_{10}$ = 4.360E−04, $A_{12}$ = −4.128E−04, $A_{14}$ = 1.749E−03,
$A_{16}$ = −9.217E−04
Fifth Surface k = 0.000, $A_4$ = −1.669E−01, $A_6$ = 3.449E−02, $A_8$ = 1.711E−02,
$A_{10}$ = 1.272E−03, $A_{12}$ = 1.558E−02, $A_{14}$ = −1.450E−02,
$A_{16}$ = 3.060E−03
Sixth Surface k = 0.000, $A_4$ = −1.013E−01, $A_6$ = 3.107E−02, $A_8$ = −2.091E−03,
$A_{10}$ = 2.399E−03, $A_{12}$ = −7.179E−03, $A_{14}$ = 6.162E−03,
$A_{16}$ = −1.932E−03
Seventh Surface k = 0.000, $A_4$ = 1.764E−01, $A_6$ = −1.312E−01, $A_8$ = 9.052E−02,
$A_{10}$ = −5.515E−02, $A_{12}$ = 6.803E−03, $A_{14}$ = 6.051E−03,
$A_{16}$ = −1.996E−03
Eighth Surface k = 0.000, $A_4$ = 1.544E−02, $A_6$ = 2.808E−02, $A_8$ = −1.245E−02,
$A_{10}$ = 5.630E−04, $A_{12}$ = −1.402E−03, $A_{14}$ = 3.276E−04,
$A_{16}$ = 2.191E−04
Ninth Surface k = 0.000, $A_4$ = −1.589E−01, $A_6$ = 6.782E−02, $A_8$ = −2.826E−02,
$A_{10}$ = 5.799E−03, $A_{12}$ = −1.550E−03, $A_{14}$ = 3.395E−04,
$A_{16}$ = 2.769E−06

-continued

Basic data are shown below.
f = 4.42 mm, Fno = 2.2, ω = 37.7°
Unit: mm

Tenth Surface k = 0.000, $A_4$ = −1.297E−01, $A_6$ = 2.914E−02, $A_8$ = −8.582E−03,
$A_{10}$ = 9.292E−04, $A_{12}$ = 1.999E−04, $A_{14}$ = −5.198E−05,
$A_{16}$ = 2.927E−06
Eleventh Surface k = 0.000, $A_4$ = −1.069E−01, $A_6$ = 1.578E−02, $A_8$ = 4.037E−04,
$A_{10}$ = 1.271E−05, $A_{12}$ = −5.888E−05, $A_{14}$ = 6.394E−06,
$A_{16}$ = −1.280E−07
Twelfth Surface k = 0.000, $A_4$ = −8.190E−02, $A_6$ = 2.405E−02, $A_8$ = −3.662E−03,
$A_{10}$ = 2.028E−04, $A_{12}$ = 9.910E−06, $A_{14}$ = −1.747E−06,
$A_{16}$ = 6.099E−08 f1 = 3.90 mm
f2 = 5.80 mm
f3 = −4.09 mm
f4 = 18.87 mm
f5 = −100.43 mm
f6 = −12.71 mm
f56 = −12.74 mm
F1 = 5.00 mm
F2 = −57.38 mm

The Values of the Respective Conditional Expressions are as Follows:

$f1/f2 = 0.67$ $F1/f = 1.13$ $f2/f = 1.31$ $f1/f3 = −0.95$

F2/F1 = −11.48

$D34/f = 0.12$ $f5/f4 = −5.32$ $f56/f = −2.89$ $f6/f56 = 1.00$ $f6/f = −2.88$

Accordingly, the imaging lens of Numerical Data Example 6 satisfies the above-described conditional expressions. The distance on the optical axis X from the object-side surface of the first lens L1 to the image plane IM (length without the filter 10) is 5.80 mm, and downsizing of the imaging lens is attained.

Figure 17:
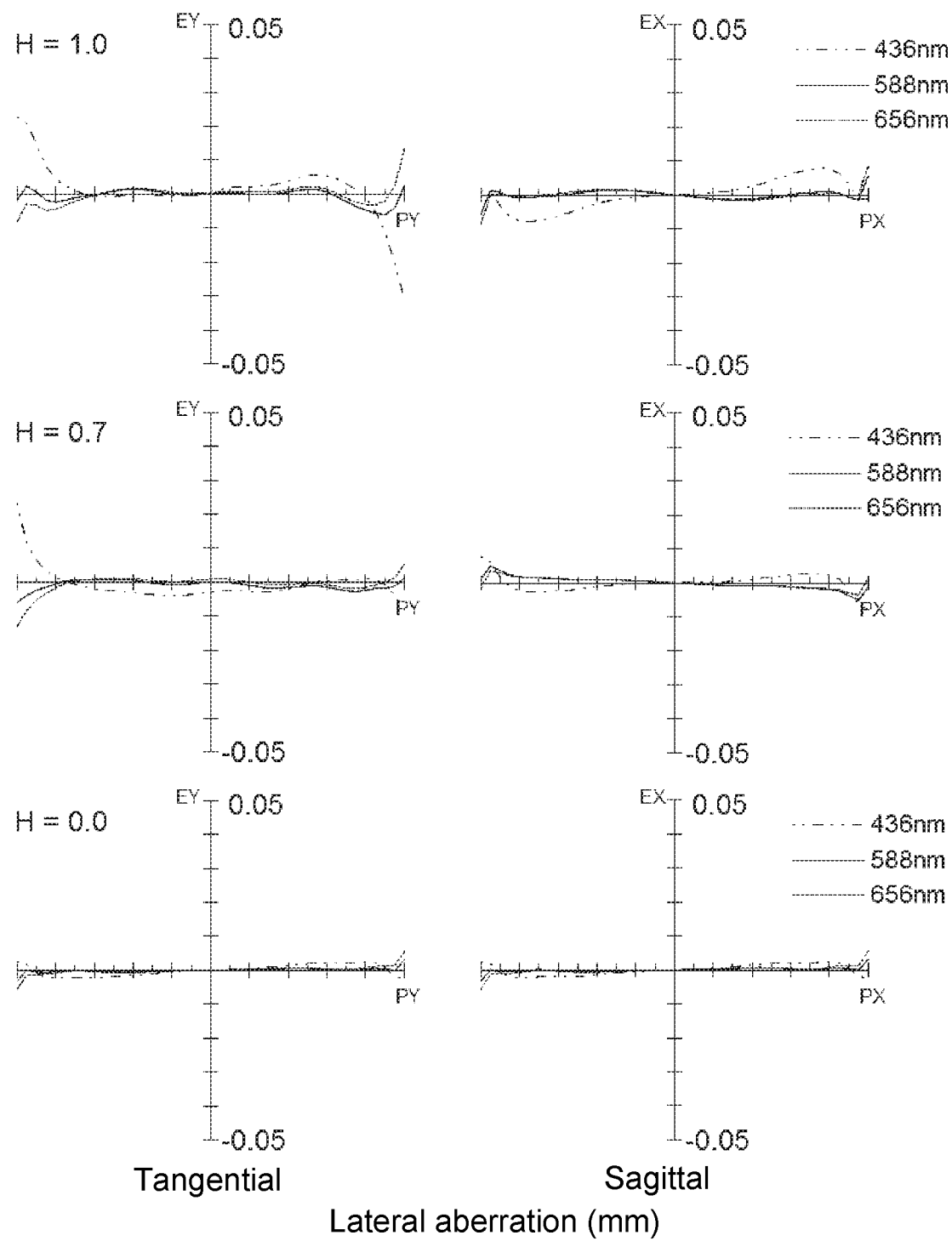
FIG. 17 is an aberration diagram showing a lateral aberration of the imaging lens of FIG. 16.
Figure 18:
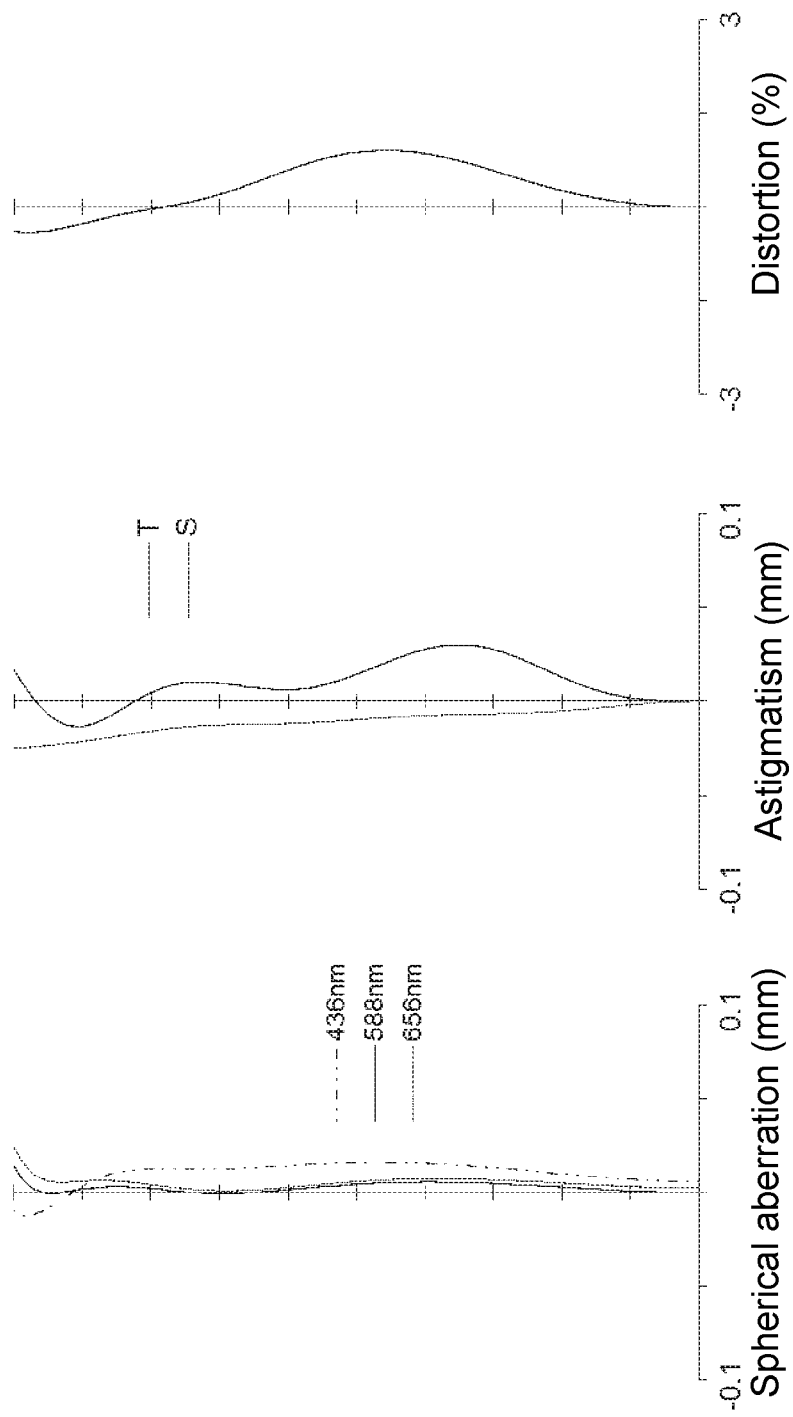
FIG. 18 is an aberration diagram showing a spherical aberration, astigmatism, and a distortion of the imaging lens of FIG. 16.
Figure 19:
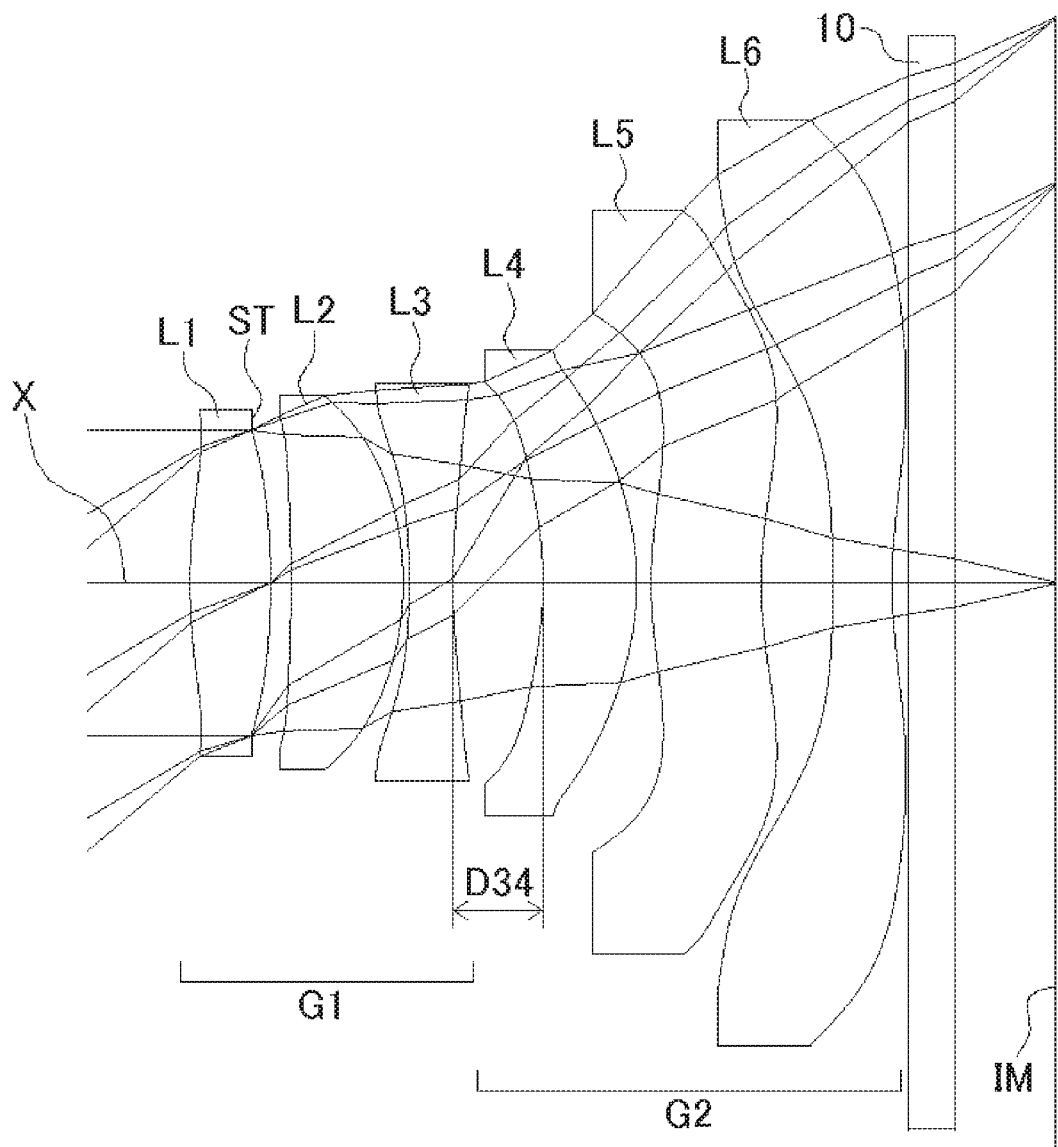
FIG. 19 shows a sectional view of a schematic configuration of an imaging lens in Numerical Data Example 7 according to the embodiment of the present invention.

FIG. 17 shows a lateral aberration that corresponds to the image height ratio H, and FIG. 18 shows a spherical aberration (mm), astigmatism (mm), and a distortion (%), respectively, of the imaging lens of Numerical Data Example 6. As shown in FIGS. 17 and 18, according to the imaging lens of Numerical Data Example 6, the aberrations are also satisfactorily corrected.

NUMERICAL DATA EXAMPLE 7

Basic data are shown below.
f = 4.30 mm, Fno = 2.2, ω = 40.2°
Unit: mm

Surface Data

| Surface Number i | r | d | nd | vd |
|---|---|---|---|---|
| (Object) | ∞ | ∞ | | |
| 1* | 3.481 | 0.517 | 1.5346 | 56.1(=vd1) |
| 2*(Stop) | −5.004 | 0.131 | | |
| 3* | −9.022 | 0.717 | 1.5346 | 56.1(=vd2) |
| 4* | −1.978 | 0.039 | | |
| 5* | −5.567 | 0.281 | 1.6355 | 24.0(=vd3) |
| 6* | 4.042 | 0.577(=D34) | | |
| 7* | −2.352 | 0.600 | 1.6142 | 26.0(=vd4) |
| 8* | −1.897 | 0.092 | | |
| 9* | 2.617 | 0.705 | 1.5346 | 56.1(=vd5) |
| 10* | 2.620 | 0.458 | | |
| 11* | −12.894 | 0.381 | 1.5346 | 56.1(=vd6) |
| 12* | 3.288 | 0.100 | | |
| 13 | ∞ | 0.300 | 1.5168 | 64.2 |
| 14 | ∞ | 0.649 | | |
| (Image plane) | ∞ | | | |

Aspheric Surface Data

First Surface k = 0.000, $A_4$ = −5.529E−02, $A_6$ = −1.943E−03, $A_8$ = −4.003E−02,
$A_{10}$ = 2.322E−02, $A_{12}$ = 1.073E−02, $A_{14}$ = −2.193E−02,
$A_{16}$ = 9.475E−03
Second Surface k = 0.000, $A_4$ = −2.363E−02, $A_6$ = 2.586E−03, $A_8$ = −2.887E−02,
$A_{10}$ = 1.906E−02, $A_{12}$ = 2.767E−02, $A_{14}$ = −5.102E−02,
$A_{16}$ = 2.631E−02
Third Surface k = 0.000, $A_4$ = 3.794E−02, $A_6$ = −2.509E−02, $A_8$ = 2.200E−02,
$A_{10}$ = −5.348E−02, $A_{12}$ = 2.091E−02, $A_{14}$ = −5.594E−03,
$A_{16}$ = 3.944E−03
Fourth Surface k = 0.000, $A_4$ = −1.782E−02, $A_6$ = −2.103E−02, $A_8$ = 2.501E−03,
$A_{10}$ = 2.279E−04, $A_{12}$ = −1.102E−03, $A_{14}$ = 8.723E−04,
$A_{16}$ = −7.985E−04
Fifth Surface k = 0.000, $A_4$ = −1.498E−01, $A_6$ = 4.669E−02, $A_8$ = 2.390E−02,
$A_{10}$ = −7.375E−04, $A_{12}$ = 1.289E−02, $A_{14}$ = −1.463E−02,
$A_{16}$ = 3.616E−03
Sixth Surface k = 0.000, $A_4$ = −9.326E−02, $A_6$ = 3.885E−02, $A_8$ = −1.429E−04,
$A_{10}$ = 1.505E−03, $A_{12}$ = −7.099E−03, $A_{14}$ = 6.277E−03,
$A_{16}$ = −2.019E−03
Seventh Surface k = 0.000, $A_4$ = 1.374E−01, $A_6$ = −1.221E−01, $A_8$ = 8.381E−02,
$A_{10}$ = −5.938E−02, $A_{12}$ = 9.481E−03, $A_{14}$ = 5.872E−03,
$A_{16}$ = −1.715E−03
Eighth Surface k = 0.000, $A_4$ = 3.155E−02, $A_6$ = 1.808E−02, $A_8$ = −1.385E−02,
$A_{10}$ = 1.194E−03, $A_{12}$ = −1.112E−03, $A_{14}$ = 2.761E−04,
$A_{16}$ = 2.848E−04
Ninth Surface k = 0.000, $A_4$ = −1.570E−01, $A_6$ = 5.478E−02, $A_8$ = −2.065E−02,
$A_{10}$ = 2.264E−03, $A_{12}$ = −2.503E−04, $A_{14}$ = 1.755E−04,
$A_{16}$ = −2.848E−05

-continued

Basic data are shown below.
f = 4.30 mm, Fno = 2.2, ω = 40.2°
Unit: mm

Tenth Surface k = 0.000, $A_4$ = −1.209E−01, $A_6$ = 2.828E−02, $A_8$ = −8.362E−03,
$A_{10}$ = 9.025E−04, $A_{12}$ = 2.104E−04, $A_{14}$ = −5.160E−05,
$A_{16}$ = 2.613E−06
Eleventh Surface k = 0.000, $A_4$ = −8.595E−02, $A_6$ = 1.544E−02, $A_8$ = 2.164E−04,
$A_{10}$ = 2.321E−05, $A_{12}$ = −5.827E−05, $A_{14}$ = 6.477E−06,
$A_{16}$ = −1.623E−07
Twelfth Surface k = 0.000, $A_4$ = −9.589E−02, $A_6$ = 2.497E−02, $A_8$ = −3.648E−03,
$A_{10}$ = 1.962E−04, $A_{12}$ = 8.815E−06, $A_{14}$ = −1.715E−06,
$A_{16}$ = 6.812E−08 f1 = 3.92 mm
f2 = 4.58 mm
f3 = −3.64 mm
f4 = 10.62 mm
f5 = 51.52 mm
f6 = −4.86 mm
f56 = −6.08 mm
F1 = 4.69 mm
F2 = −18.81 mm

The Values of the Respective Conditional Expressions are as Follows:

$f1/f2$=0.86

$F1/f$=1.09

$f2/f$=1.07

$f1/f3$=−1.08

$F2/F1$=−4.01

$D34/f$=0.13

$f5/f4$=4.85

$f56/f$=−1.42

$f6/f56$=0.80

$f6/f$=−1.13

Accordingly, the imaging lens of Numerical Data Example 7 satisfies the above-described conditional expressions except the conditional expression (13). The distance on the optical axis X from the object-side surface of the first lens L1 to the image plane IM (length without the filter 10) is 5.44 mm, and downsizing of the imaging lens is attained.

Figure 20:
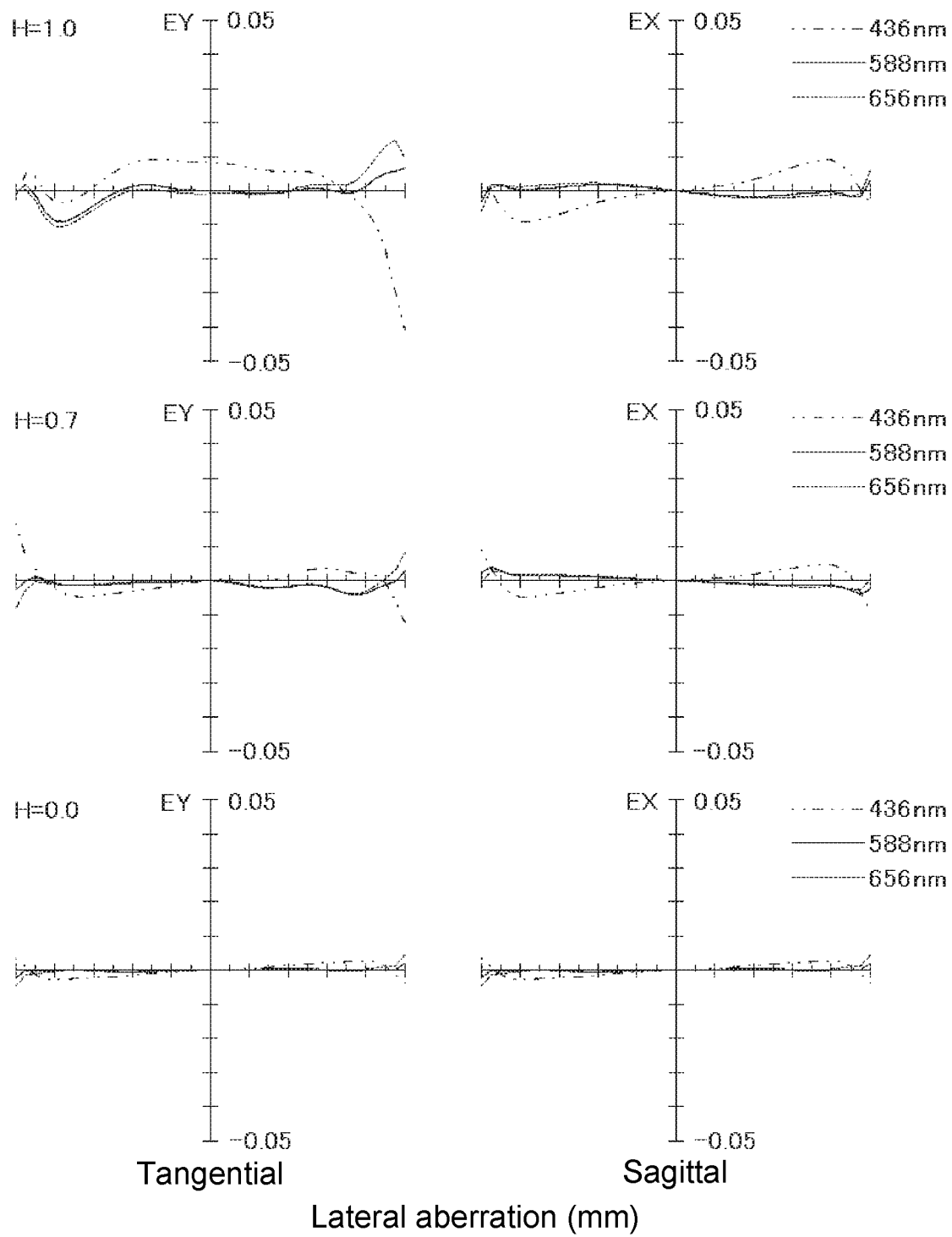
FIG. 20 is an aberration diagram showing a lateral aberration of the imaging lens of FIG. 19.
Figure 21:
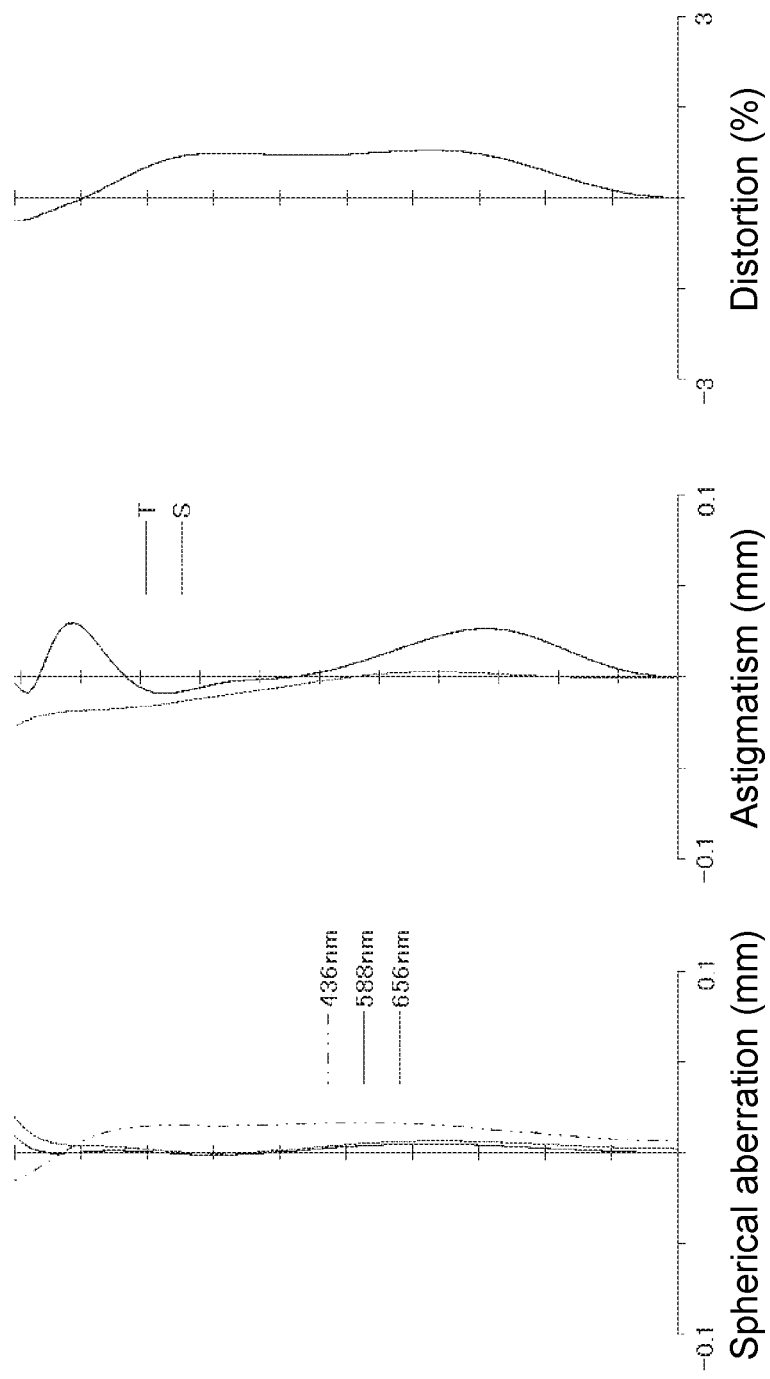
FIG. 21 is an aberration diagram showing a spherical aberration, astigmatism, and a distortion of the imaging lens of FIG. 19.

FIG. 20 shows a lateral aberration that corresponds to the image height ratio H, and FIG. 21 shows a spherical aberration (mm), astigmatism (mm), and a distortion (%), respectively, of the imaging lens of Numerical Data Example 7. As shown in FIGS. 20 and 21, according to the imaging lens of Numerical Data Example 7, the aberrations are also satisfactorily corrected.

According to the imaging lens of the embodiment described above, it is achievable to have a wide angle of view (2ω) of 80° or greater. According to Numerical Data Examples 1 to 7, the imaging lenses have wide angles of view of 70.8° to 80.4°. According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel decreases, so that an image tends to be dark. As a method for correcting this problem, there is a method of enhancing light-receiving sensitivity of the imaging element using an electrical circuit. However, when the light-receiving sensitivity increases, a noise component that does not directly contribute to image formation is also amplified, so that it is necessary to use another circuit for reducing the noise. According to the imaging lenses of Numerical Data Examples 1 to 7, the Fnos are as small as 2.2 to 2.4. According to the imaging lens of the embodiment, it is possible to obtain a sufficiently bright image without the above-described electrical circuit.

Accordingly, when the imaging lens of the embodiment is mounted in an imaging optical system, such as cameras built in portable devices including cellular phones, portable information terminals, and smartphones, digital still cameras, security cameras, onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, onboard cameras, and network cameras.

The disclosure of Japanese Patent Application No. 2014-136552, filed on Jul. 2, 2014, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens group; and
a second lens group, arranged in this order from an object side to an image plane side,
wherein said first lens group includes a first lens, a second lens, and a third lens having negative refractive power,
said second lens group includes a fourth lens having positive refractive power, a fifth lens, and a sixth lens,
said imaging lens has a total of six single lenses;
said third lens has a concave surface facing the image plane side at a paraxial region thereof,
said fifth lens has a concave surface facing the image plane side at a paraxial region thereof, and
said fourth lens has an Abbe's number vd4 so that the following conditional expression is satisfied:
15<vd4<35.

2. The imaging lens according to claim 1, wherein said first lens has a focal length f1 and said second lens has a focal length f2 so that the following conditional expression is satisfied:
0.3<f1/f2<0.9.

3. The imaging lens according to claim 1, wherein said first lens group has a focal length F1 so that the following conditional expression is satisfied:
0.8<F1/f<1.2,
where f is a focal length of a whole lens system.

4. The imaging lens according to claim 1, wherein said second lens has a focal length f2 so that the following conditional expression is satisfied:

$1.0 < f2/f < 2.0$, where f is a focal length of a whole lens system.

5. The imaging lens according to claim 1, wherein said first lens has a focal length f1 and said third lens has a focal length f3 so that the following conditional expression is satisfied:

$-1.2 < f1/f3 < -0.4$.

6. The imaging lens according to claim 1, wherein said first lens group has a focal length F1 and said second lens group has a focal length F2 so that the following conditional expression is satisfied:

$-12 < F2/F1 < -1.5$.

7. The imaging lens according to claim 1, wherein said third lens is arranged away from the fourth lens by a distance D34 on an optical axis thereof so that the following conditional expression is satisfied:

$0.05 < D34/f < 0.35$, where f is a focal length of a whole lens system.

8. The imaging lens according to claim 1, wherein said fourth lens has a focal length f4 and said fifth lens has a focal length f5 so that the following conditional expression is satisfied:

$-15 < f5/f4 < -5$.

9. The imaging lens according to claim 1, wherein said fifth lens and said sixth lens have a composite focal length f56 so that the following conditional expression is satisfied:

$-3 < f56/f < -0.8$, where f is a focal length of a whole lens system.

10. The imaging lens according to claim 1, wherein said sixth lens has a focal length f6 so that the following conditional expression is satisfied:

$-3.5 < f6/f < -0.5$, where f is a focal length of a whole lens system.

11. An imaging lens comprising:
a first lens group; and
a second lens group having negative refractive power, arranged in this order from an object side to an image plane side,
wherein said first lens group includes a first lens, a second lens, and a third lens having negative refractive power,
said second lens group includes a fourth lens having positive refractive power, a fifth lens, and a sixth lens,
said imaging lens has a total of six single lenses;
said fifth lens has a concave surface facing the image plane side at a paraxial region thereof, and
said fourth lens has an Abbe's number vd4 so that the following conditional expression is satisfied:

$15 < vd4 < 35$.

12. The imaging lens according to claim 11, wherein said first lens has a focal length f1 and said second lens has a focal length f2 so that the following conditional expression is satisfied:

$0.3 < f1/f2 < 0.9$.

13. The imaging lens according to claim 11, wherein said first lens group has a focal length F1 so that the following conditional expression is satisfied:

$0.8 < F1/f < 1.2$, where f is a focal length of a whole lens system.

14. The imaging lens according to claim 11, wherein said second lens has a focal length f2 so that the following conditional expression is satisfied:

$1.0 < f2/f < 2.0$, where f is a focal length of a whole lens system.

15. The imaging lens according to claim 11, wherein said first lens has a focal length f1 and said third lens has a focal length f3 so that the following conditional expression is satisfied:

$-1.2 < f1/f3 < -0.4$.

16. The imaging lens according to claim 11, wherein said first lens group has a focal length F1 and said second lens group has a focal length F2 so that the following conditional expression is satisfied:

$-12 < F2/F1 < -1.5$.

17. The imaging lens according to claim 11, wherein said third lens is arranged away from the fourth lens by a distance D34 on an optical axis thereof so that the following conditional expression is satisfied:

$0.05 < D34/f < 0.35$, where f is a focal length of a whole lens system.

18. The imaging lens according to claim 11, wherein said fourth lens has a focal length f4 and said fifth lens has a focal length f5 so that the following conditional expression is satisfied:

$-15 < f5/f4 < -5$.

19. The imaging lens according to claim 11, wherein said fifth lens and said sixth lens have a composite focal length f56 so that the following conditional expression is satisfied:

$-3 < f56/f < -0.8$, where f is a focal length of a whole lens system.

20. The imaging lens according to claim 11, wherein said sixth lens has a focal length f6 so that the following conditional expression is satisfied:

$-3.5 < f6/f < -0.5$, where f is a focal length of a whole lens system.

* * * * *